(12) United States Patent
Ishikura

(10) Patent No.: US 11,048,456 B2
(45) Date of Patent: Jun. 29, 2021

(54) IMAGE FORMING APPARATUS AND EVENT DETECTION SYSTEM

(71) Applicant: SHARP KABUSHIKI KAISHA, Sakai (JP)

(72) Inventor: Tomoya Ishikura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/734,874

(22) Filed: Jan. 6, 2020

(65) Prior Publication Data

US 2020/0233621 A1 Jul. 23, 2020

(30) Foreign Application Priority Data

Jan. 23, 2019 (JP) .............................. JP2019-009121

(51) Int. Cl.
*G06K 9/00* (2006.01)
*G06F 3/12* (2006.01)
*H04N 5/232* (2006.01)

(52) U.S. Cl.
CPC .......... *G06F 3/1259* (2013.01); *G06F 3/1207* (2013.01); *H04N 5/23229* (2013.01)

(58) Field of Classification Search
None
See application file for complete search history.

(56) References Cited

U.S. PATENT DOCUMENTS

| | | | | |
|---|---|---|---|---|
| 5,999,634 A | * | 12/1999 | Abbott | G06K 9/00771 |
| | | | | 348/140 |
| 7,460,692 B2 | * | 12/2008 | Mizutani | G07C 9/37 |
| | | | | 382/118 |
| 7,646,501 B2 | * | 1/2010 | Ikeda | G06F 3/1288 |
| | | | | 358/1.15 |
| 9,626,580 B2 | * | 4/2017 | Gupta | G06K 9/46 |
| 10,313,627 B2 | * | 6/2019 | Oya | H04N 21/2743 |
| 2011/0087535 A1 | * | 4/2011 | Yoshizawa | G06Q 20/20 |
| | | | | 705/14.26 |
| 2019/0012122 A1 | * | 1/2019 | Miyata | H04N 1/00893 |

FOREIGN PATENT DOCUMENTS

JP  2018-093401 A  6/2018

* cited by examiner

*Primary Examiner* — Paul F Payer
(74) *Attorney, Agent, or Firm* — ScienBiziP, P.C.

(57) ABSTRACT

An image forming apparatus includes a job executor that executes a job, an image former that performs an image forming process on a basis of the job, an acquiror that acquires image data captured, and a detector that analyzes the image data to detect an event. The detector detects the event when the job executor is in a standby state.

10 Claims, 22 Drawing Sheets

FIG. 6

| VIDEO DATA ID | FILE NAME | AQUISITION DATE AND TIME | EVENT DETECTION DETECTED/UNDETECTED FLAG |
|---|---|---|---|
| 201811011200 | 201811011200.mpg | 2018/11/01 13:02:00 | NO |
| 201811011300 | 201811011300.mpg | 2018/11/01 14:02:00 | YES |
| 201811011400 | 201811011400.mpg | 2018/11/01 15:02:00 | - |
| ⋮ | ⋮ | ⋮ | ⋮ |

FIG. 7

| VIDEO DATA ID | EVENT OCCURRENCE DATE AND TIME | EVENT TYPE | EVENT CONTENT |
|---|---|---|---|
| 201811011300 | 2018/11/01 13:32:10.03 | REFLECTION OF MOVING OBJECT | (100,100)-(150,150) |
| ⋮ | ⋮ | ⋮ | ⋮ |
| 201811011300 | 2018/11/01 13:32:12.07 | REFLECTION OF MOVING OBJECT | (102,100)-(152,150) |
| 201811011300 | 2018/11/01 13:32:12.10 | REFLECTION OF MOVING OBJECT | (104,100)-(154,150) |
| 201811011300 | 2018/11/01 13:32:12.13 | REFLECTION OF MOVING OBJECT | (106,100)-(158,150) |
| ⋮ | ⋮ | ⋮ | ⋮ |
| 201811022300 | 2018/11/02 23:10:40.00 | REFLECTION OF MOVING OBJECT (REFLECTION OF PERSON) | (200,50)-(230,170) |
| 201811022300 | 2018/11/02 23:10:50.00 | GENERATION OF ABNORMAL SOUND | - |
| ⋮ | ⋮ | ⋮ | ⋮ |

| ACCOUNT NAME | PASSWORD |
|---|---|
| user1 | aaa123 |
| user2 | bbb456 |
| ⋮ | ⋮ |

IMAGE FORMING APPARATUS AND EVENT DETECTION SYSTEM

This Nonprovisional application claims priority under 35 U.S.C. § 119(a) on Patent Application No. 2019-009121 filed in Japan on 23 Jan. 2019, the entire contents of which are hereby incorporated by reference.

BACKGROUND OF THE INVENTION

Field of the Invention

The present invention relates to an image forming apparatus and an event detection system.

Description of the Background Art

In related art, network cameras (IP cameras) and Web cameras have been used. In addition, techniques related to a monitoring system that performs remote monitoring with the use of network cameras as monitoring cameras have been proposed. For example, a technique has been proposed, wherein in a case where images captured by a network camera are transmitted to a server sequentially, a network bandwidth necessary for each camera to continue monitoring an important object is allocated without greatly changing the overall bandwidth required for each camera (see, for example, Japanese Unexamined Patent Application Publication No. 2018-093401).

However, even if the technique described in Japanese Unexamined Patent Application Publication No. 2018-093401 is used, video taken by a network camera cannot be kept as video data. Therefore, a person who monitors with the use of a monitoring system must always check the video. In addition, since a server for managing the network camera is required, labor for building the monitoring system and server costs are required.

Moreover, even if an apparatus that can be linked to the camera (for example, an image forming apparatus including a camera) is used, the apparatus may not be applicable for monitoring. For example, there is no recording function and images cannot be checked later, or there is no way to display images captured by the camera, or images can be captured only at the timing of capturing by a user and not when some event occurs. Furthermore, even if the apparatus that can be linked with the camera includes a sensor that detects an event, if the apparatus does not have enough resources when the sensor is activated, there is a possibility that an image captured by the camera may be missed or an event cannot be analyzed and the event may be missed.

In view of the above-described problems, it is an object of the present invention to provide an image forming apparatus capable of acquiring video data stored in an imaging apparatus and analyzing the video data to detect an event while waiting for execution of a job.

SUMMARY OF THE INVENTION

Means for Solving the Problems

In order to solve the above-described problems, an image forming apparatus according to the present invention includes a job executor that executes a job, an image former that performs an image forming process on a basis of the job, an acquiror that acquires image data captured, and a detector that analyzes the image data to detect an event. The detector detects the event when the job executor is in a standby state.

The event detection system of the present invention includes an imaging apparatus and an image forming apparatus. The imaging apparatus includes an inputter that inputs an image and an image data storage that stores the image input as image data. The image forming apparatus includes a job executor that executes a job, an image former that performs an image forming process on a basis of the job, an acquiror that acquires the image data from the imaging apparatus, and a detector that analyzes the image data to detect an event. The detector detects the event when the job executor is in a standby state.

Effect of the Invention

According to the present invention, it is possible to acquire video data stored in an imaging apparatus and analyze the video data to detect an event while waiting for execution of a job.

BRIEF DESCRIPTION OF THE DRAWINGS

FIG. 6 is a table illustrating an example of a data configuration of a video data database in the first embodiment.

FIG. 7 is a table illustrating an example of a data configuration of an analysis data database in the first embodiment.

FIG. 8 is a table illustrating an example of a data configuration of an authentication information storage area in the first embodiment.

DESCRIPTION OF THE PREFERRED EMBODIMENTS

Hereinafter, embodiments of the present invention will be described with reference to the drawings. In this embodiment, an event detection system including an image forming apparatus of the present invention will be described as an example.

1. First Embodiment 1.1 Overall Configuration

Figure 1:
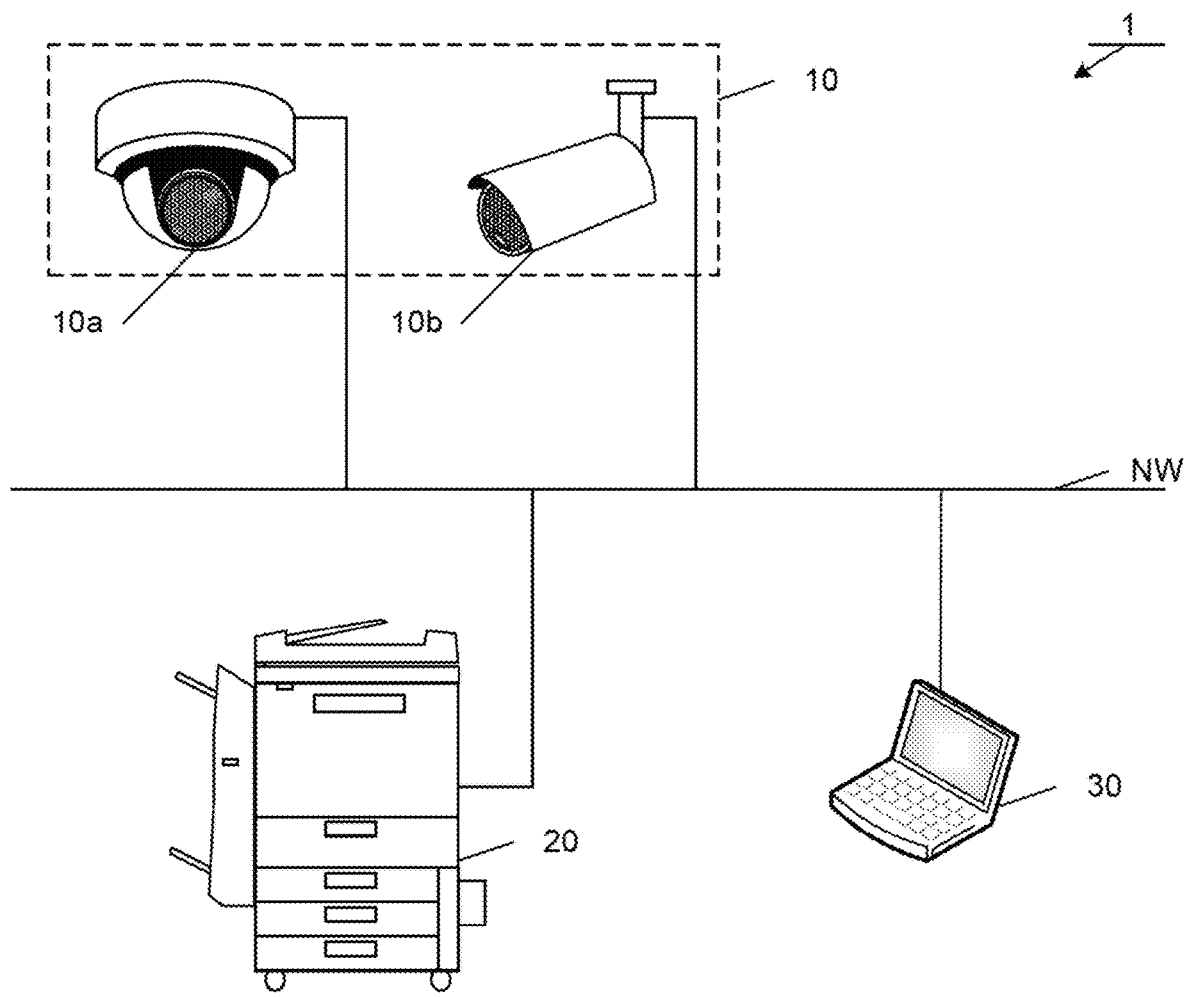
FIG. 1 is a diagram for explaining an overall configuration of an event detection system in a first embodiment.

The overall configuration of an event detection system 1 of this embodiment will be described with reference to FIG. 1. As illustrated in FIG. 1, the event detection system 1 includes an imaging apparatus 10, an image forming apparatus 20, and a terminal apparatus 30. While a network NW is assumed to be a local area network (LAN), communication may be established by another communicator (for example, an Internet network via an external network such as long term evolution (LTE)/5G) instead of the LAN.

The imaging apparatus 10 is connected to a network and capable of storing a captured video as video data, and is a so-called IP camera. The image forming apparatus 20 forms an image on a recording paper or the like with the image data input from the outside, thereby outputting an image, and is a so-called multifunction machine. The terminal apparatus 30 is an information processing apparatus operated by a user. The terminal apparatus 30 includes devices such as a personal computer (PC), a smartphone, and a tablet.

As illustrated in FIG. 1, a plurality of imaging apparatuses 10 (an imaging apparatus 10a and an imaging apparatus 10b) may be connected to the network NW. In this case, video data is output for each imaging apparatus 10. In addition, a plurality of terminal apparatuses 30 may be connected to the network NW.

1.2 Overview of Process 1.2.1 Overview of Process Flow

Figure 2:
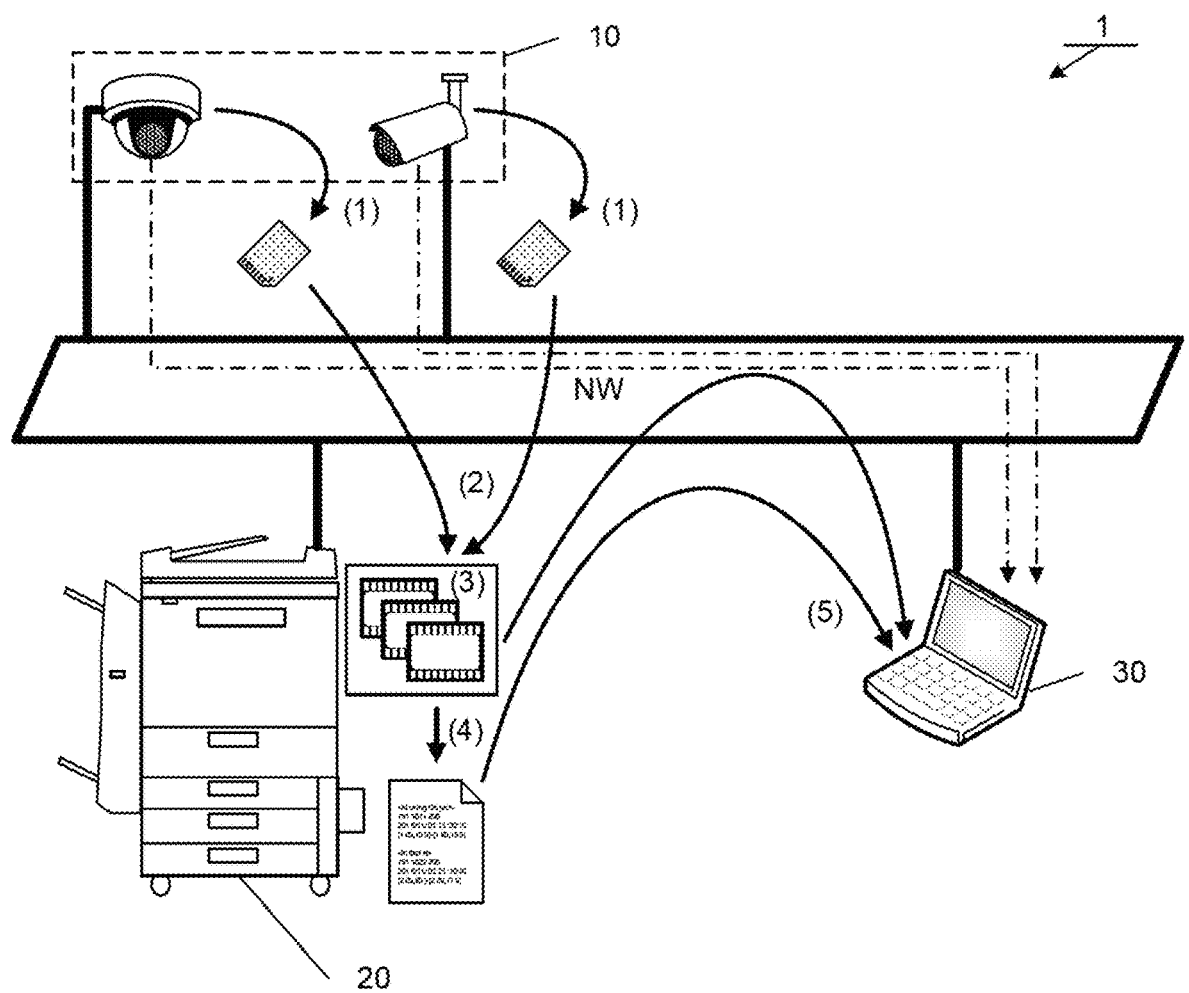
FIG. 2 is a diagram illustrating an overview of a process in the first embodiment.

The overview of the process of this embodiment will be described with reference to FIG. 2. The arrows illustrated in FIG. 2 indicate data flow, and the numbers with brackets indicate the order in which data is transmitted and the order in which the data is processed. An overview of the process flow of this embodiment will be described in order.

1. Storage of Video Data

The imaging apparatus 10 captures a certain range of images at all times or in a predetermined period (for example, from 18:00 on weekdays to 8:00 on the following day), and stores the captured videos as video data in a storage medium connected to the imaging apparatus 10. The storage medium may be a portable storage medium such as an SD card, a CompactFlash (registered trademark), and a universal serial bus (USB) memory, and a storage medium (storage device) that is not supposed to be removed, such as a hard disk drive (HDD) and a solid state drive (SSD).

In this embodiment, it is assumed that the video data includes moving image data composed of image data input (captured) by the imaging apparatus 10 and audio data recorded by the imaging apparatus 10. In addition, it is assumed that the imaging apparatus 10 stores the image data in the storage medium of the imaging apparatus 10 as a video file of a predetermined length of time (for example, one hour).

2. Acquisition of Video Data

When in a standby state (for example, when a print job is not executed), the image forming apparatus 20 periodically connects to the imaging apparatus 10 to acquire video data from the imaging apparatus 10, and stores the video data in the storage medium of the image forming apparatus 20.

3. Event Detection

The image forming apparatus 20 analyzes the video data to detect an event. The event is a characteristic change detected on the basis of the video data. Specifically, the image forming apparatus 20 analyzes the video data and detects an event corresponding to an event detection condition when the event detection condition set by an administrator of the image forming apparatus 20 is fulfilled.

The event detection condition is a condition that the video data fulfills when the image forming apparatus 20 detects an event. As the event detection condition, for example, as the condition for detecting an event such as the reflection of a moving object, information such as a condition (threshold value) regarding a difference value between luminance values in the image data between two consecutive frames and a condition (threshold value) of a size of an area where a change has occurred is stored. The event detection condition may be determined in advance or may be set by the administrator of the image forming apparatus 20.

In this embodiment, the events detected by the image forming apparatus 20 are as follows.

a. Detection of Reflection of Moving Object (Moving Object Detection)

The image forming apparatus 20 reads out the image data (frame image data) constituting the moving image data included in the video data one frame at a time. Then, the image forming apparatus 20 compares the image data of successive frames and determines whether an area where a steep change has occurred is included. If an area where a steep change has occurred is included, the image forming apparatus 20 determines that a moving object has been reflected, and detects an event of reflection of the moving object.

Whether an area where a steep change has occurred is included is determined on the basis of, for example, a change in the luminance value of the frame image data and an event detection condition. Here, the luminance value takes a value from 0 to 255 for each pixel, and the condition of the difference value between the luminance values (for example, "50 or more") and an area condition (for example, "20% or more") are stored in the event detection condition in advance. In doing so, the image forming apparatus 20 obtains a luminance value for each pixel with respect to two consecutive pieces of frame image data, obtains a difference between the luminance values of the corresponding pixels in the two frame image data, and calculates a difference value between the luminance values for each pixel. Next, the image forming apparatus 20 obtains an area of the area where the difference value between the luminance values fulfills the condition of the difference value between the luminance values (50 or more) stored in the event detection condition. Then, the image forming apparatus 20 determines whether the ratio of the area of the relevant area with respect to the area of the frame image data fulfills the area condition (20% or more) stored in the event detection condition. In doing so, if the ratio is larger than the area condition stored in the event detection condition, the image forming apparatus 20 determines that an area where a steep change has occurred is included in the video data.

Any method other than those described above may be used as long as the method can determine whether an area where a steep change has occurred is included. For example, a difference value between color values instead of luminance values may be used. In addition, if there are a plurality of areas where the difference value between the luminance values fulfills the condition of the difference value between the luminance values stored in the event detection condition, the image forming apparatus 20 may detect each area as an area where a different steep change has occurred.

Moreover, the image forming apparatus 20 may analyze the cause of an event such as what kind of change has occurred in the area where the steep change has occurred. For example, the image forming apparatus 20 performs face detection or human body detection on the area where the steep change has occurred, and detects reflection of a person if a face or human body is detected in the area where the steep change has occurred.

In addition, the image forming apparatus 20 further stores, in the event detection condition, a condition of a difference value between the luminance values when the blinking of an illumination is assumed to have occurred. Then, the image forming apparatus 20 detects the blinking of the illumination if the difference value between the luminance values of the area where the steep change has occurred is larger than the condition of the difference value between the luminance values when the blinking of the illumination is assumed to have occurred.

Furthermore, the image forming apparatus 20 may obtain a distance between the imaging apparatus 10 and a position where the moving object is present, a moving speed, an actual size of the moving object, and the like.

b. Detection of Leaving Behind/Taking Away

The image forming apparatus 20 stores in advance reference image data which is image data obtained by capturing, the range to be captured, by the imaging apparatus 10. Then, the image forming apparatus 20 compares the reference image data with the frame image data. In doing so, an object of a certain size continues to be reflected in the frame image data. If there is an object that is not reflected in the corresponding area of the reference image data, the image forming apparatus 20 detects an event of leaving behind.

In addition, if the object of a certain size is reflected in the reference image data but the object is not reflected in the corresponding area of the video data, the image forming apparatus 20 detects an event of taking away.

As an event detection condition in the detection of leaving behind/taking away, a size condition (for example, "2% or more") that the image forming apparatus 20 determines to be an object, or a time condition when an object is determined to be left behind (for example, "10 seconds or more") are stored.

c. Detection of Generation of Abnormal Sound (Abnormal Sound Detection)

The volume of the audio data included in the video data is calculated for each frame, and it is determined whether there is a frame that has generated a sound that fulfills a volume condition (for example, "70 dB or higher") stored the event detection condition. If there is a frame that fulfills the volume condition stored in the event detection condition, the image forming apparatus 20 detects the generation of an abnormal sound at a time corresponding to the frame. Specific examples of the abnormal sound include a sound that glass is broken and footsteps.

4. Output of Analysis Data

When an event is detected as a result of analyzing the video data, the image forming apparatus 20 stores information related to the detected event in the storage medium as analysis data. In this way, the image forming apparatus 20 links the video data and the analysis data. The analysis data includes an event occurrence date and time indicating a date and time when the event has occurred, an event type indicating a type of the event occurred, and event content indicating the detailed information of the event.

Information corresponding to the event type stored in the event content. For example, if the event type is moving object detection, coordinate information indicating an area that contains a moving object is stored in the event content. Information such as a distance to the moving object, a size of the moving object, a moving speed, and an amount of change in a luminance value may be stored in the event content.

If the event type is the detection of leaving behind/taking away, in the event content, coordinate information indicating an area where the leaving behind/taking away has occurred, information about an object left behind or an object taken away may be stored. When the event type is the generation of an abnormal sound, volume information may be stored in the event content.

5. Acquisition of Analysis Data and Play of Video Data

The terminal apparatus 30 acquires, from the image forming apparatus 20, the video data and the analysis data stored in the image forming apparatus 20. In addition, the terminal apparatus 30 plays the video data while adding information to the video data on the basis of the information included the analysis data. For example, the terminal apparatus 30 adds an area indicated by the coordinate information stored in the event content to the video and displays the video. In this way, the user can grasp a location where a moving object is reflected and where leaving behind/taking away has occurred, and can easily check the video data. In addition, the terminal apparatus 30 queries the analysis data by an event type and an event occurrence date and time. In this way, the user can watch and confirm the video when the event has occurred, and save the trouble of checking the video in a normal state.

In addition to acquiring and displaying video data and analysis data from the image forming apparatus 20, the terminal apparatus 30 may directly receive and display the video captured by the imaging apparatus 10 as indicated by a dashed line. In this way, the imaging apparatus 10 can be used as a surveillance camera.

In addition, the video data stored in the imaging apparatus 10 is periodically acquired by the image forming apparatus 20. Therefore, the image forming apparatus 20 also functions as an apparatus for backing up the video data.

1.2.2 State Transition of Image Forming Apparatus

Figure 3:
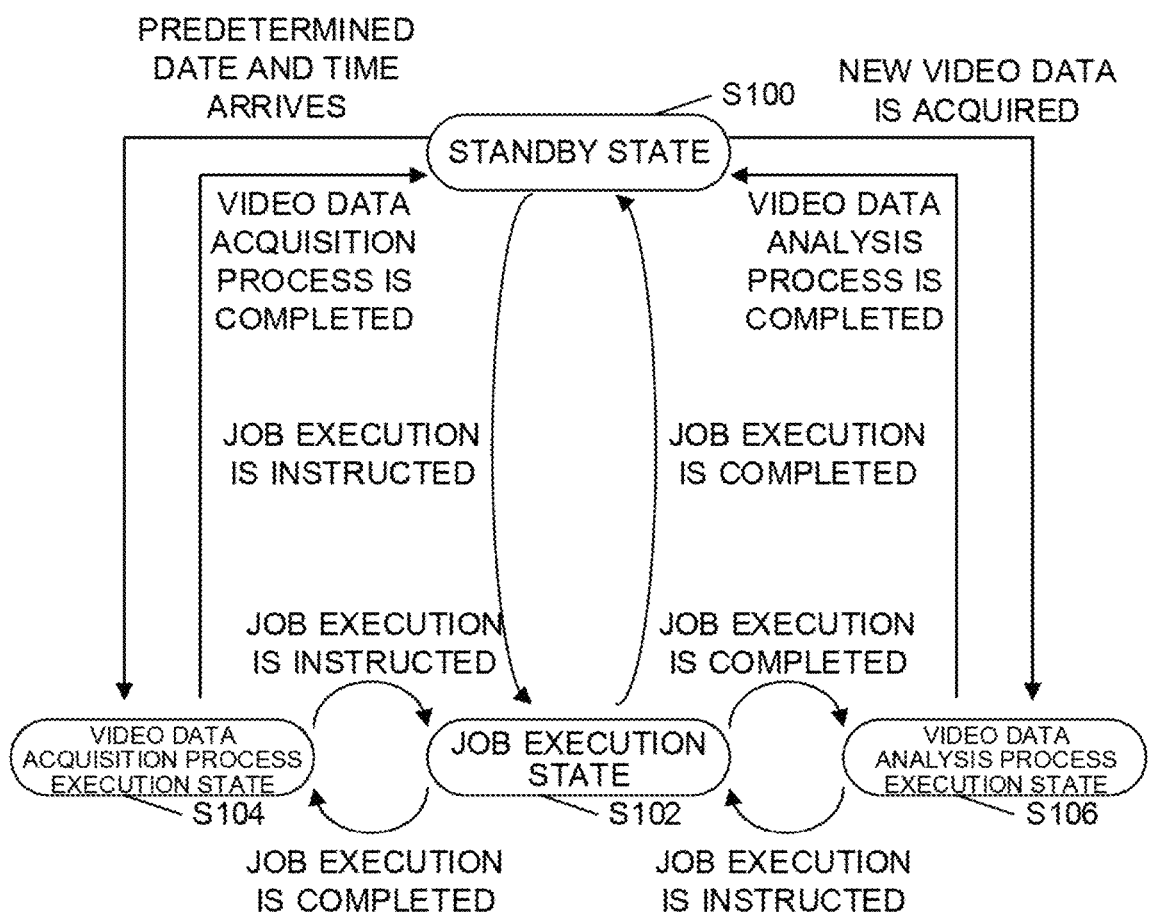
FIG. 3 is a diagram illustrating state transition in the first embodiment.

Next, the state transition of the image forming apparatus 20 will be described with reference to FIG. 3. The state of the image forming apparatus 20 is managed by a controller of the image forming apparatus 20.

In this embodiment, the image forming apparatus 20 is assumed to have a "standby state", "job execution state", "video data acquisition process execution state", and "video data analysis process execution state".

The "standby state" is a state where the image forming apparatus 20 does not affect job execution even if the image data acquisition process or the image data analysis process described later is executed. For example, the "standby state" is a state waiting for a job execution instruction from the user, or a state where a job is not executed, or a state where only a job with a low priority job is executed.

In this embodiment, a job is a unit in which the image for apparatus 20 performs a predetermined process. For example, the image forming apparatus 20 handles each process (copying and printing) for outputting (forming) image data to a recording paper and scanning the image data and transmitting the image data by electronic mail as one job. In addition, a job with a low priority is, for example, a job that is not a user's operation target but is executed (a background job), a job that occurs later, or a job that can be interrupted.

The "job execution state" is a state where a job instructed to be executed by the user is executed. For example, a state where the image forming apparatus 20 executes a copy or print job. The "video data acquisition process execution state" is a state where the image forming apparatus 20 executes a process for acquiring video data from the imaging apparatus 10 (video data acquisition process). The "video data analysis process execution state" is a state where the image forming apparatus 20 executes a process for analyzing the video data acquired from the imaging apparatus 10 (video data analysis process).

Next, state transition will be described. In the following description, the state of the image forming apparatus 20 is simply referred to as "state". First, the image forming apparatus 20 sets the state to the standby state, and then waits for a job execution instruction from the user (S100). When the execution of the job is instructed by the user, the image forming apparatus 20 changes the state to the job execution state. (S100 to S102). When the state is the job execution state, the image forming apparatus 20 executes the job instructed by the user. Then, when the job execution is completed, the image forming apparatus 20 sets the state to the standby state (S102 to S100).

When the state is the standby state, the image forming apparatus 20 changes the state to the video data acquisition process execution state at a timing when a predetermined date and time arrives (S100 to S104). If the state is the job execution state at the timing, the image forming apparatus 20 sets the state to the standby state after the job execution is completed, and further sets the state to the video data acquisition process execution state.

In addition, when a job execution is instructed by the user in the video data acquisition process execution state, the image forming apparatus 20 sets the state to the job execution state (S104 to S102). In doing so, the image forming apparatus 20 interrupts the video data acquisition process and executes the job instructed to be executed by the user. Then, when the job execution is completed, the image forming apparatus 20 sets the state to the video data acquisition process execution state, and resumes the video data acquisition process (S102 to S104). In this way, the image forming apparatus 20 prevents the user of the image forming apparatus 20 from being affected by the video data acquisition process when the image forming apparatus 20 is used by the user.

When the video data acquisition process is completed, the image forming apparatus 20 sets the state to the standby state (S104 to S100). Then, the image forming apparatus 20 determines whether new video data has been acquired from the imaging apparatus 10 in the video data acquisition process. If new video data has been acquired, the image forming apparatus 20 sets the state to the video data analysis process execution state (S100 to S106). In doing so, if the state is the job execution state, the image forming apparatus 20 sets the state to the standby state after the job execution is completed, and further sets the state to the video data analysis process execution state.

In addition, when a job execution is instructed by the user in the video data analysis process execution state, the image forming apparatus 20 sets the state to the job execution state (S106 to S102). In doing so, the image forming apparatus 20 interrupts the video data analysis process and executes the job instructed to be executed by the user. Then, when the job execution is completed, the image forming apparatus 20 sets the state to the video data analysis process execution state, and resumes the video data analysis process (S102 to S106). In addition, when the video data analysis process is completed, the image forming apparatus 20 sets the state to the standby state (S106 to S100). In this way, in the video data analysis process execution state, as is the case with the video data acquisition process execution state, the image forming apparatus 20 prevents the user of the image forming apparatus 20 from being affected by the video data analysis process when the image forming apparatus 20 is used by the user.

The image forming apparatus 20 may have a state where the operation of the image forming apparatus 20 is temporarily stopped when no operation is performed by the user, such as a power saving state or a sleep state. When the image forming apparatus 20 is in the power saving state or the sleep state and is to be brought into the video data acquisition process execution state, the state may be set to the power saving state or the sleep state again after the video data acquisition process is completed. Similarly, when the state is the power saving state or the sleep state and the image forming apparatus 20 is to be brought into the video data analysis process state, the state of the image forming apparatus 20 may be set to the power saving state or the sleep state after the video data acquisition process is completed.

In addition, the image forming apparatus 20 may reduce the processing speed of the video data acquisition process and the video data analysis process when a job execution is instructed by the user during the execution of the video data acquisition process and the video data analysis process. In this way, the image forming apparatus 20 may prevent the job execution instructed by the user from being affected.

The image forming apparatus 20 may change the state by a method other than the method described above. For example, in the case of the video data acquisition process execution state or the video data analysis process execution state, when an operation inputter 240 is operated by the user, the image forming apparatus 20 may set the state to the standby state. In this way, when the operation inputter 240 is operated by the user, it is possible to avoid the influence of the processes of image data acquisition and analysis on the user's operation (for example, influence of slow response to the user's operation).

When the state is the video data acquisition process execution state or video data analysis process execution state, and jobs that can be executed in a short time occur continuously, the image forming apparatus 20 may return the state to the original state after all the jobs that have occurred are completed. In other words, when the job execution state is switched to the video data acquisition process execution state or the video data analysis process execution state in a short time, the state changes frequently, and the processing of the image forming apparatus 20 may be slow. The image forming apparatus 20 can prevent the processing of the image forming apparatus 20 from slowing by not changing the state frequently.

1.3 Functional Configuration

1.3.1 Imaging Apparatus

Figure 4:
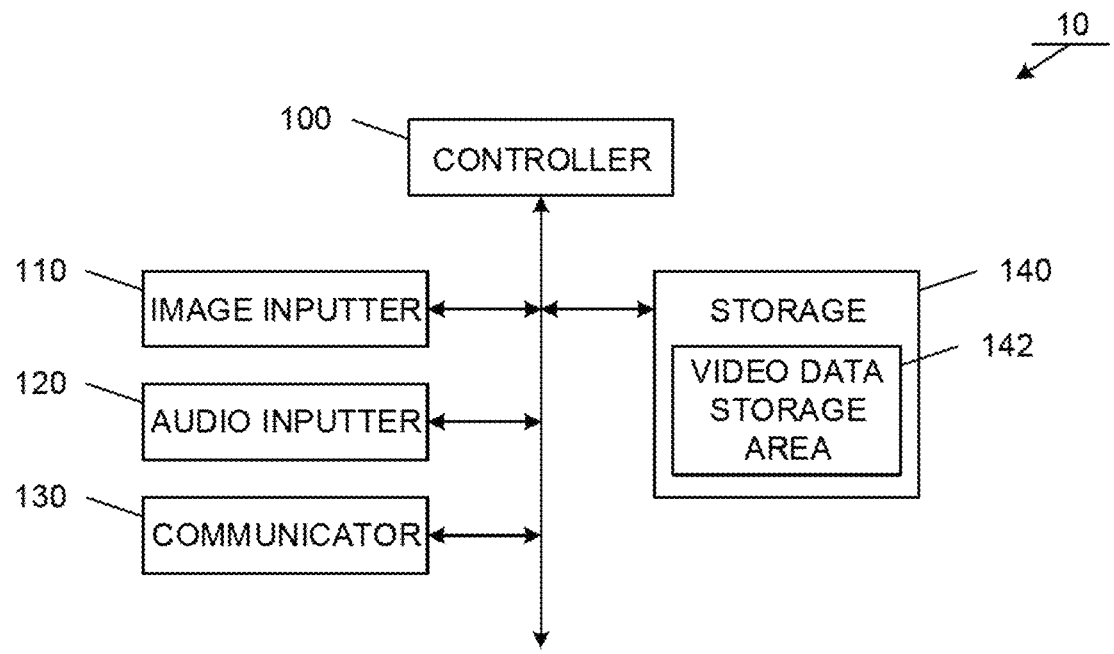
FIG. 4 is a diagram for explaining a functional configuration of an imaging apparatus in the first embodiment.

The functional configuration of the imaging apparatus 10 will be described with reference to FIG. 4. As illustrated in FIG. 4, the imaging apparatus 10 includes a controller 100, an image inputter 110, an audio inputter 120, and a communicator 130, and a storage 140.

The controller 100 is a functional unit for controlling the entire imaging apparatus 10. The controller 100 implements various functions by reading and executing various programs, and includes, for example, one or a plurality of computing devices (central processing units (CPUs)) or the like.

The image inputter 110 includes an image input device such as a camera, and is a functional unit that outputs an image input by the image input device to the controller 100. The audio inputter 120 includes an audio input device such as a microphone, and is a functional unit that outputs the audio input by the audio input device to the controller 100. The controller 100 generates video data on the basis of the image output from the image inputter 110 and the audio output from the audio inputter 120.

The communicator 130 is a functional unit for the imaging apparatus 10 to communicate with an external device. For example, the communicator 130 includes an network interface card (NIC) used in a wireless LAN or a communication module that can be connected to a long term evolution (LTE)/LTE-Advanced (LTE-A)/license-assisted access (LAA) using LTE)/5G line.

The storage 140 is a functional unit that stores various programs and various data necessary for the operation of the imaging apparatus 10. The storage 140 is detachable from the imaging apparatus 10, and may include a small storage medium, a semiconductor memory SSD, or an HDD.

The storage 140 secures a video data storage area 142 for storing video data. The controller 100 stores the generated video data in the video data storage area 142.

1.3.2 Image Forming Apparatus

Figure 5:
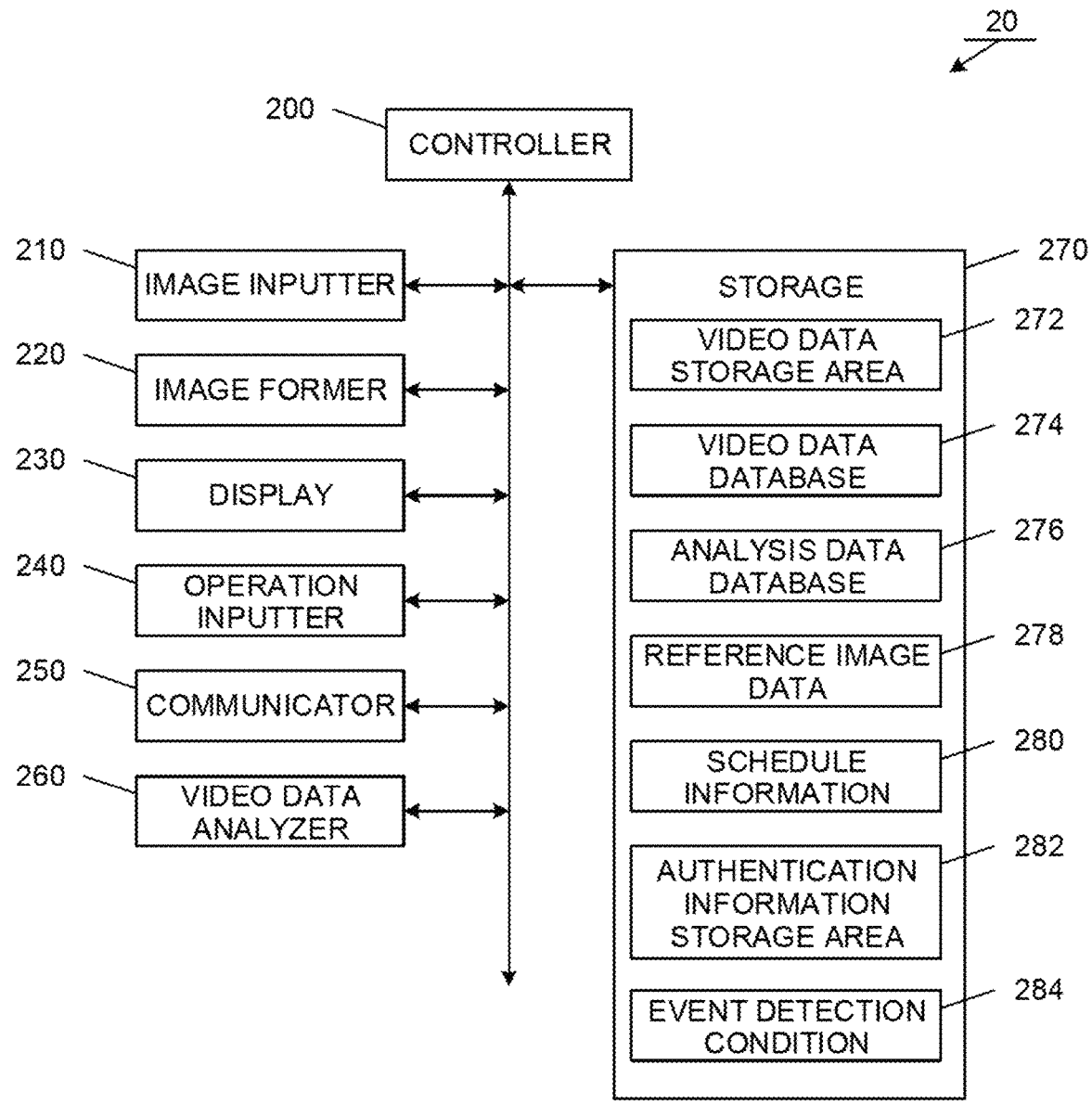
FIG. 5 is a diagram for explaining a functional configuration of an image forming apparatus in the first embodiment.

The functional configuration of the image forming apparatus 20 will be described with reference to FIG. 5. As illustrated in FIG. 5, the image forming apparatus 20 includes a controller 200, an image inputter 210, an image former 220, a display 230, an operation inputter 240, a communicator 250, a video data analyzer 260, and a storage 270.

The controller 200 is a functional unit for controlling the entire image forming apparatus 20. The controller 200 implements various functions by reading and executing various programs, and includes, for example, one or a plurality of computing devices (CPUs).

In addition, the controller 200 manages the state of the image forming apparatus 20. The state of the image forming apparatus 20 is transitioned among four states: "standby state", "job execution state", and "video data acquisition process execution state", and "video data analysis process execution state" as described in the overview of the process flow. In addition, when a job execution is instructed by the user, the controller 200 executes the instructed job. If the job is a job for outputting (forming) image data to a recording paper, the controller 200 controls the image former 220 to perform an image forming process.

The image inputter 210 is a functional unit that reads an image of a document and generates image data. For example, the image inputter 210 includes a scanner device equipped with a device that converts optical information such as a charge coupled device (CCD) into an electrical signal. The image inputter 210 may input (receive) the image data from other terminals via a USB memory; a storage medium such as a CompactFlash (registered trademark), or the communicator 250.

The image former 220 is a functional unit that forms image data on a recording medium (for example, a recording paper). For example, the image former 220 forms an image on the surface of a recording paper fed from a paper feed tray, and ejects the paper from a paper output tray. The image former 220 includes, for example, a laser printer or the like using an electrophotographic method.

The display 230 is a functional unit for displaying various types of information to the user, and includes, for example, a liquid crystal display (LCD). The operation inputter 240 is a functional unit for receiving operation instructions from the user, and includes various key switches and devices that detect contact input. The user of the image forming apparatus 20 inputs a function and an output condition to be used via the operation inputter 240. The image forming apparatus 20 may include a touch panel in which the display 230 and the operation inputter 240 are integrally formed. In this case, a method for detecting the touch panel input may be, for example, a general detection method such as a resistance film method, an infrared method, an electromagnetic induction method, or a capacitance method.

The communicator 250 is a functional unit for the image forming apparatus 20 to communicate with an external device. The communicator 250 includes, for example, an NIC used in a wireless LAN or a communication module that can be connected to an LTE/LTE-A/LAA/5G line.

The video data analyzer 260 is a functional unit that analyzes video data, determines whether an event has occurred, and outputs analysis data. In addition, the video data analyzer 260 may execute a process related to video data analysis, for example, a filter process for image data and audio data (for example, sharpening of image data, change in color tone, reduction of a specific frequency component volume of audio data).

The storage 270 is a functional unit that stores various programs and various data necessary for the operation of the image forming apparatus 20. The storage 270 includes, for example, a semiconductor memory SSD, an HDD, or the like.

The storage 270 secures a video data storage area 272 and an authentication information storage area 282, and further stores a video data database 274, an analysis data database 276, reference image data 278, schedule information 280, and event detection condition 284. The video data storage area 272 is for storing video data acquired from the imaging apparatus 10.

The video data database 274 stores information related to video data analyzed by the video data analyzer 260. FIG. 6 is a table illustrating the data configuration of the data stored in the video data database 274 in this embodiment. As illustrated in FIG. 6, the video data database 274 stores a video data ID (for example, "201811011200") for uniquely identifying the video data, a file name (for example, "201811011200.mpg") for identifying the corresponding video data file stored in the video data storage area 272, an acquisition date and time (for example, "2018/11/01 13:02:00" indicating a date and time when the video data has been acquired from the imaging apparatus 10), and an event detection detected/undetected flag indicating whether an event has been detected (for example, "NO").

The video data ID may be a part of the file name, a serial number, a code configured in a predetermined format, or a random character. In addition, in the event detection detected/undetected flag, "YES" is stored if an event is detected, "NO" is stored if no event is detected, and no value is stored if no video data is analyzed. In this way, it is possible to indicate whether the video data has been analyzed by referring to the event detection detected/undetected flag.

In addition, the video data storage area 272 may store attribute information related to video data, such as a video data start date and time, a video end time, a video data length, a frame rate and a bit rate, a video resolution, a file size, and a video data format. When there is a plurality of imaging apparatuses 10, the video data storage area 272 may store an attribute indicating, from which g apparatus the image has been acquired.

The analysis data database 276 stores the analysis data output by the video data analyzer 260. FIG. 7 is a table illustrating the data configuration of the data stored in the analysis data database 276 in this embodiment. As illustrated in FIG. 7, the analysis data database 276 stores a video data ID (for example, "201811011300") for uniquely identifying video data, an event occurrence date and time when the event has occurred (for example, "2018/11/01 13:32: 10.03"), an event type indicating the type of the event that has occurred (for example, "reflection of moving object"), and event content that is information related to the event that has occurred (for example, "(100,100)–(150,150)").

In this embodiment, as explained in the overview of the process flow, it is assumed that, any of "reflection of moving object", "leaving behind", "taking away", or "generation of abnormal sound" is stored in the event type, and information corresponding to the event type is stored in the event content. The cause of the event, such as "reflection of a moving object (reflection of a person)" may be included and stored in the event type.

In addition, it is assumed that the analysis data in this embodiment is stored in units of frames. Therefore, if the moving object is reflected for a certain period of time, the analysis data is stored for each frame as illustrated in D100 of FIG. 7. Analysis data may be grouped and stored for related events such as the same object being reflected or an abnormal sound continuing to be generated.

The reference image data 278 is image data that is compared with the frame image data in order for the video data analyzer 260 to determine leaving behind or taken away of an object. The reference image data 278 may be frame image data extracted from the video data, or image data obtained by capturing the imaging range of the imaging apparatus 10 in advance.

The schedule information 280 indicates a timing at which the controller 200 changes the state of the image forming apparatus 20 to the video data acquisition process execution state or the video data analysis process execution state. As the schedule information 280, for example, information such as "5 o'clock every day" and "every hour" is stored. If the information stored as schedule information 280 is "5 o'clock every day", the image forming apparatus 20 acquires video data from the imaging apparatus 10 and analyzes the acquired video data at the timing of 5 o'clock only once a day. In a case where there is a plurality of imaging apparatuses 10, the timing for acquiring video data and the timing for analyzing the acquired video data may be different for each imaging apparatus 10. In this way, it is possible to avoid congestion of the network NW, and to shift the time period during which the image forming apparatus 20 acquires and analyzes the video data.

The authentication information storage area 282 stores authentication information which is information for authenticating a user who can acquire information stored in the video data storage area 272, video data database 274, and analysis data database 276. FIG. 8 is a table illustrating the data configuration of authentication information in this embodiment. As illustrated in FIG. 8, in the authentication information, an account name (for example, "user1") for identifying the user and a password required for user authentication (for example, "abc123") are stored. A known technique can be used for the authentication method. For example, biometric authentication such as face authentication, fingerprint authentication, and iris authentication may be used. In addition, depending on the technique used for the authentication, the corresponding authentication information (for example, face information of the user to be authenticated when face authentication is used) is stored in the authentication information storage area 282.

The event detection condition 284 is information in which a condition with which the video data analyzer 260 detects an event from the video data is stored.

1.3.3 Terminal Apparatus

Figure 9:
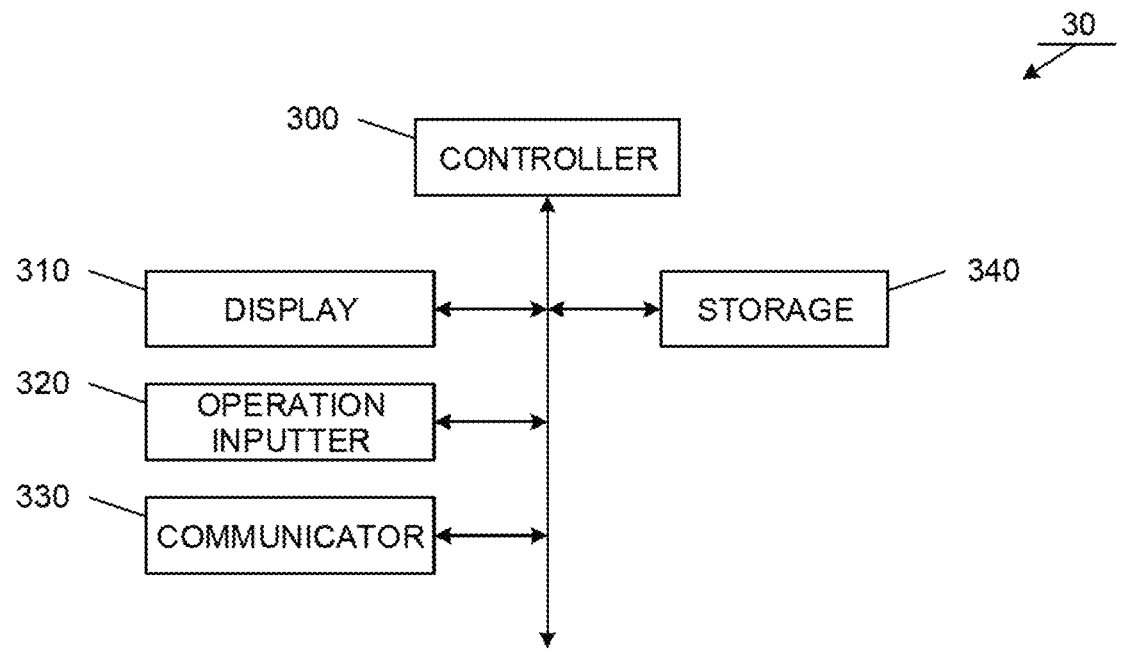
FIG. 9 is a diagram for explaining a functional configuration of a terminal apparatus in the first embodiment.

The functional configuration of the terminal apparatus 30 will be described with reference to FIG. 9. As illustrated in FIG. 9, the terminal apparatus 30 includes a controller 300, a display 310, an operation inputter 320, a communicator 330, and a storage 340.

The controller 300 is a functional unit for controlling the entire terminal apparatus 30. The controller 300 implements various functions by reading and executing various programs, and includes, for example, one or a plurality of computing devices (CPUs).

The display 310 is a functional unit for displaying various types of information, and includes, for example, devices such as an LCD and an organic EL display. The operation inputter 320 is a functional unit for accepting an operation input from the user, and includes, for example, an external input device such as a keyboard and a mouse. If the terminal apparatus 30 is an apparatus such as a smart phone or tablet, the display 310 and the operation inputter 320 may be integrated into a touch panel.

The communicator 330 is a functional unit for the terminal apparatus 30 to communicate with an external device. The communicator 250 includes, for example, an NIC used in a wireless LAN or a communication module that can be connected to an LTE/LTE-A/LAA/5G line.

The storage 340 is a functional unit that stores various programs and various data necessary for the operation of the terminal apparatus 30. The storage 340 includes, for example, a semiconductor memory SSD, an HDD, or the like.

1.4 Process Flow

Next, the process flows of the imaging apparatus 10, the image forming apparatus 20, and the terminal apparatus 30 in this embodiment will be described.

1.4.1 Imaging Apparatus

Figure 10:
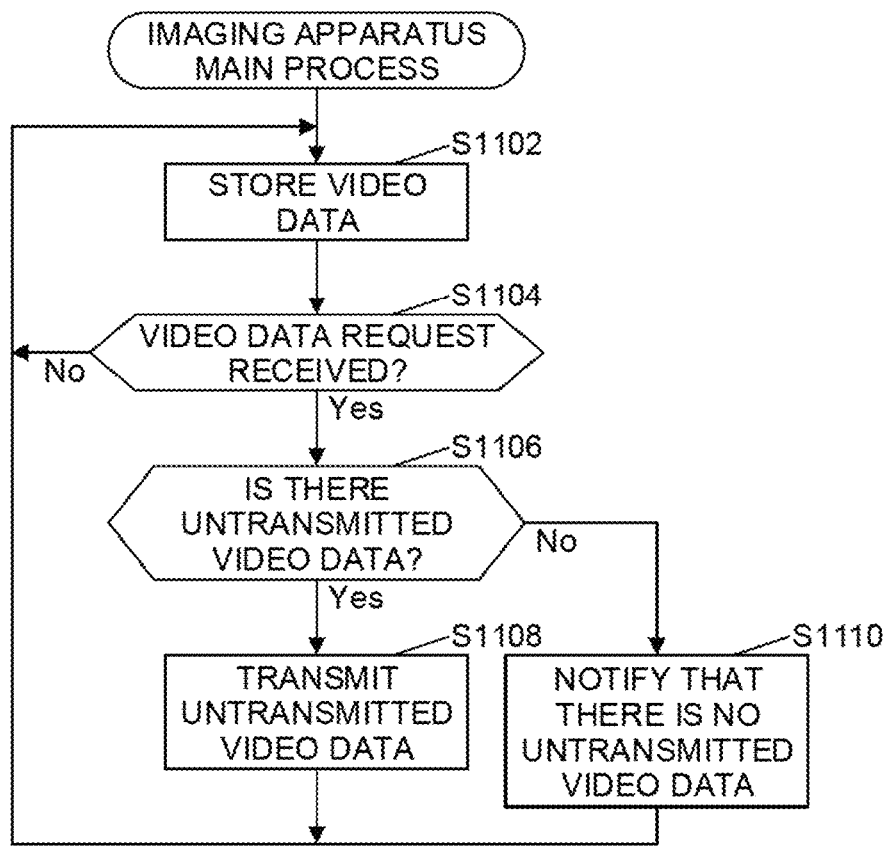
FIG. 10 is a flowchart for explaining a flow of a main process of the imaging apparatus in the first embodiment.

The main process of the imaging apparatus 10 will be described with reference to FIG. 10. First, the controller 100 generates video data on the basis of the image output from the image inputter 110 and the audio output from the audio inputter 120, and stores the video data in the video data storage area 142 (step S1102).

Next, the controller 100 determines whether a video data request has been received from the image forming apparatus 20 (step S1104). The video data request is a notification for requesting acquisition of the video stored in the video data storage area 142 from the image forming apparatus 20.

The video data request includes date and time information such as the date and time when the video data has been last acquired. If there is video data stored after the date and time included in the video data request in the video data storage area 142, the controller 100 determines that there is untransmitted video data. That is, the untransmitted video data is video data stored after the date and time included in the video data request. Upon receipt of the video data request, the controller 100 determines whether there is untransmitted video data (step S1104; Yes to step S1106).

If there is untransmitted video data, the controller 100 transmits the untransmitted video data to the apparatus that has transmitted the video data request (step S1106; Yes to step S1108). In doing so, the controller 100 may notify the apparatus that has transmitted the video data request that there is untransmitted video data. In addition, if there is no untransmitted video data, the controller 100 notifies the apparatus that has transmitted the video data request that there is no untransmitted video data (step S1106; No to step S1110). Then, the process returns to step S1102.

Even if the video data request is not received in step S1104, the process returns to step S1102 (step S1104; No to step S1102). In this way, the imaging apparatus 10 continues to process the generation of the video data and the storage of the video data.

In the above description, while the date and time information is included in the video data request, the date and time information may not be included. If the date and time information is not included in the video data request, the controller 100 transmits, to the image forming apparatus 20, one or a predetermined number of pieces of the most recently stored video data of the video data stored in the video data storage area 142.

1.4.2 Image Forming Apparatus

Figure 11:
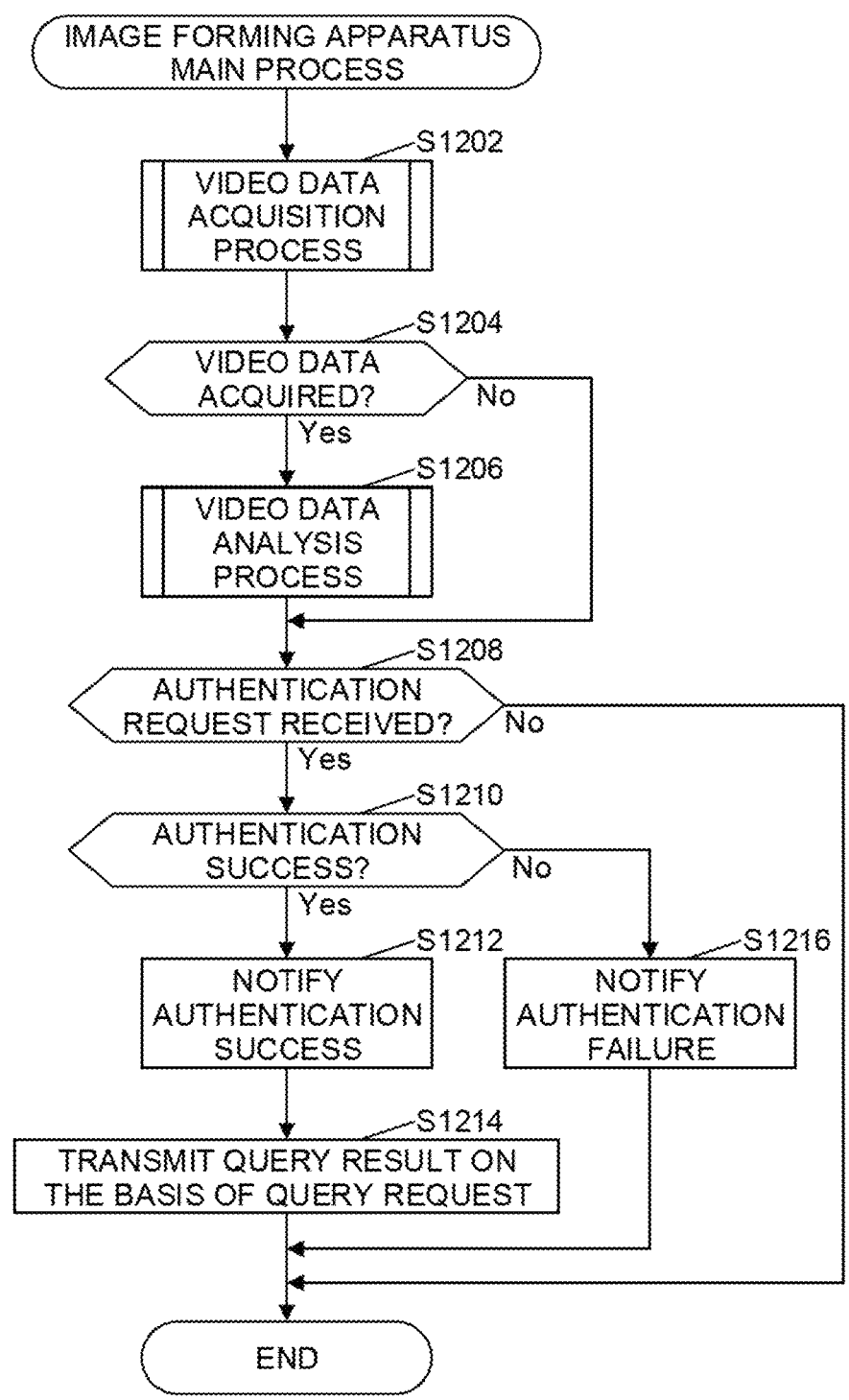
FIG. 11 is a flowchart for explaining a flow of a main process of the image forming apparatus in the first embodiment.

The main process of the image forming apparatus 20 will be described with reference to FIG. 11. The controller 200 of the image forming apparatus 20 manages the state of the image forming apparatus 20 in parallel with the execution of the main process. Therefore, the controller 200 of the image forming apparatus 20 executes the main process in accordance with the state of the image forming apparatus 20.

Figure 12:
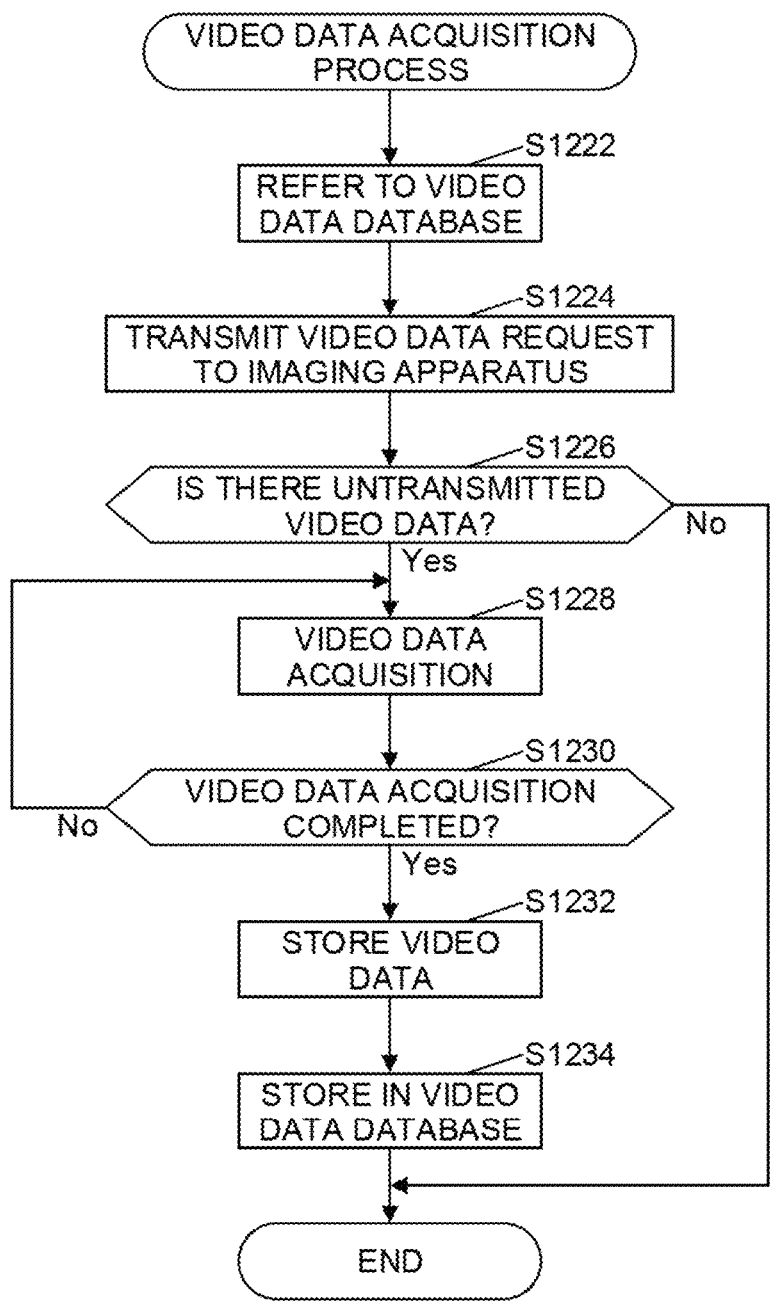
FIG. 12 is a flowchart for explaining a flow of a video data acquisition process in the first embodiment.

First of all, when the state is the video data acquisition process execution state, the controller 200 executes the video data acquisition process (step S1202). The video data acquisition process will be described with reference to FIG. 12.

First, the controller 200 refers to the video data database 274 to read out the acquisition date and time of the last acquired video data from the acquisition date and time (step S1222). Then, the controller 200 transmits, to the imaging apparatus 10, the video data request including the acquisition date and time of the last acquired video data read out in step S1222 (step S1224).

Next, the controller 200 determines whether there is untransmitted video data in the imaging apparatus 10 (step S1226). If there is untransmitted video data, the controller 200 acquires the video data from the imaging apparatus 10 (step S1226; Yes to step S1228). The controller 200 may determine whether there is untransmitted video data on the basis of the notification transmitted from the imaging apparatus 10. If there is no untransmitted video data, the controller 200 ends the video data acquisition process (step S1226; No).

The controller 200 executes the acquisition of the video data until the acquisition of the video data is completed (step S1230; No to step S1228). Then, when the acquisition of the video data is completed, the controller 200 stores the acquired video data in the video data storage area 272 (step S1230; Yes to step S1232). In addition, the controller 200 stores in the video data database 274, as information related to the video data, a video data ID, the file name of the video data stored in the video data storage area 272, and the acquisition date and time of the video data (step S1234). Nothing is stored in the event detection detected/undetected flag. In addition, when the video data acquisition process is completed, the controller 200 sets the state of the image forming apparatus 20 to the standby state.

Referring back to FIG. 11, the controller 200 determines whether the video data has been acquired from the imaging apparatus 10 in the video data acquisition process in step S1202 (step S1204). For example, if there is data that has no value stored in the event detection detected/undetected flag in the data stored in the video data database 274, the controller 200 may determine that the video data has been acquired from the imaging apparatus 10. When the video data is acquired and the state is the video data analysis execution state, the video data analyzer 260 executes the video data analysis process (step S1204; Yes to step S1206). The video data analysis process will be described with reference to FIG. 13.

Figure 13:
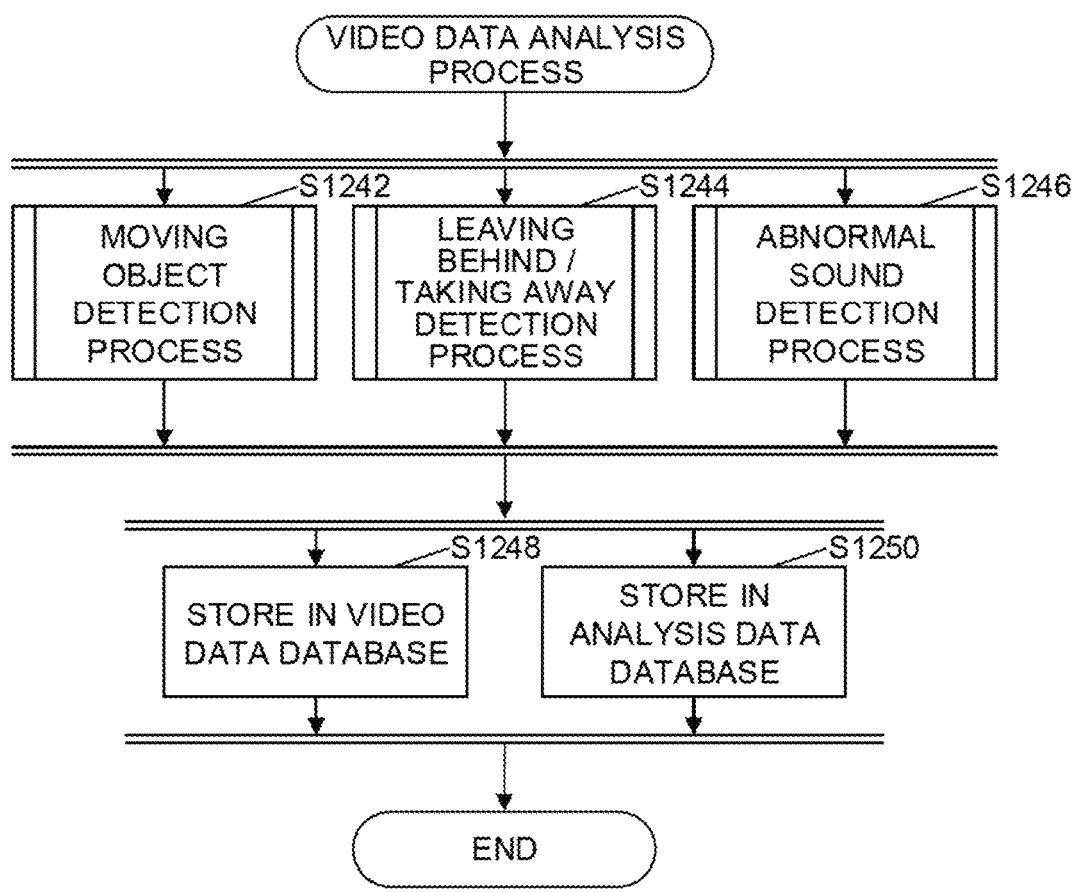
FIG. 13 is a flowchart for explaining a flow of a video data analysis process in the first embodiment.

FIG. 13 is a flowchart of the process performed by the video data analyzer 260. The process illustrated in FIG. 13 is performed for each video data acquired in the video data acquisition process. Therefore, if there are a plurality of pieces of video data acquired in the video data acquisition process, the video data analyzer 260 executes the video data analysis process for each video data. When executing the video data analysis process, the video data analyzer 260 generates a video data ID for the video data subject to the video data analysis process.

The video data analyzer 260 executes a moving object detection process (step S1242), a leaving behind/taking away detection process (step S1244), and an abnormal sound detection process (step S1246). The moving object detection process is for the video data analyzer 260 to detect an event of a moving object detection. The leaving behind/taking away detection process is for the video data analyzer 260 to detect an event of leaving behind and an event of taking away. The abnormal sound detection process is for the video data analyzer 260 to detect an event of an abnormal sound detection.

Figure 14:
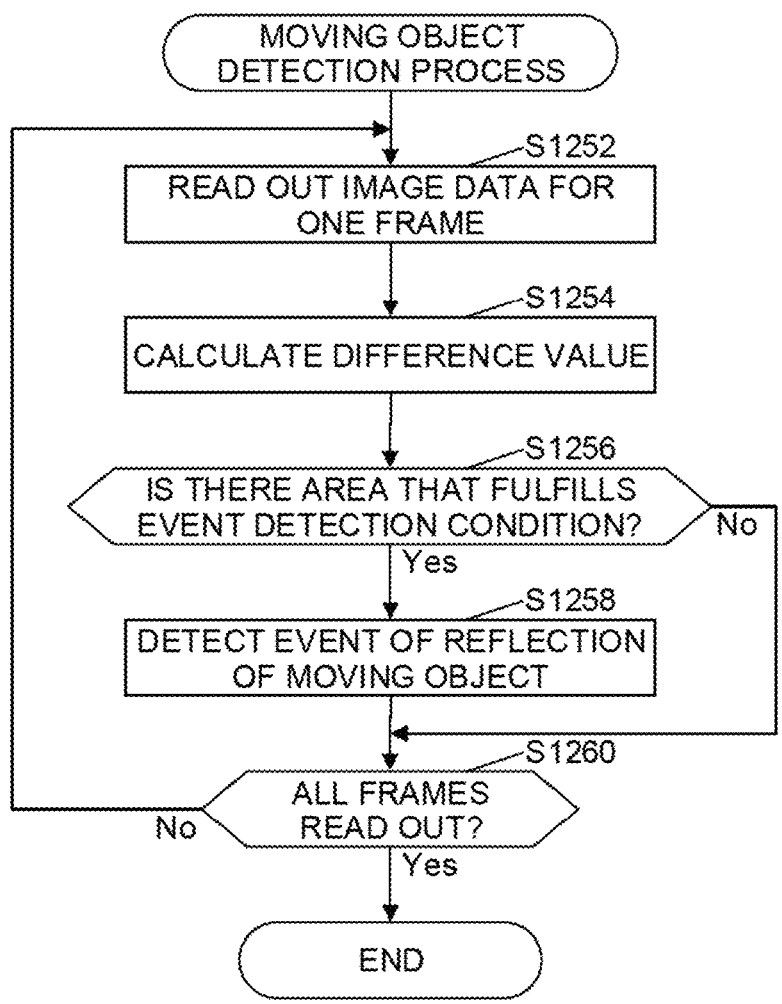
FIG. 14 is a flowchart for explaining a flow of a moving object detection process in the first embodiment.

The moving object detection process will be described with reference to FIG. 14. First, the video data analyzer 260 reads out the frame image data for one frame (step S1252).

Next, the video data analyzer 260 calculates a difference value between the frame image data read out in step S1252 and the frame image data of a frame immediately before the frame read in step S1252 (step S1254). In step S1252, if there is no image data of the frame corresponding to the immediately preceding frame, such as when the image data of the first frame is read out, steps S1254 to S1258 are skipped.

Then, the video data analyzer 260 determines whether an area that fulfills the event detection condition is included on the basis of a difference value (step S1256). For example, in step S1254, the video data analyzer 260 calculates a difference value between luminance values, and in step S1256, compares the difference value between the luminance values calculated in step S1254 with the condition of the difference value between luminance values and the area condition stored in the event detection condition, and extracts an area that fulfills the event detection condition. If an area that fulfills the event detection condition is extracted, the video data analyzer 260 determines in step S1256 that there is an area that fulfills the event detection condition.

If there is an area that fulfills the event detection condition, the video data analyzer 260 then detects the event of reflection of a moving object (step S1256; Yes to step S1258). In doing so, the video data analyzer 260 acquires, as event information, the coordinates of the area extracted in step S1256 and the date and time corresponding to the frame read out in step S1252. In addition, the video data analyzer 260 may analyze the area extracted in step S1256 to determine whether the reflection of a person has occurred or whether the blinking of an illumination has occurred.

Next, the video data analyzer 260 determines whether the image data of all frames has been read out (step S1260). If the image data of all frames has not been read out, the process returns to step S1252 (step S1260; No to step S1252). When the image data of all frames has been read out, the video data analyzer 260 ends the moving object detection process (step S1260; Yes).

Figure 15:
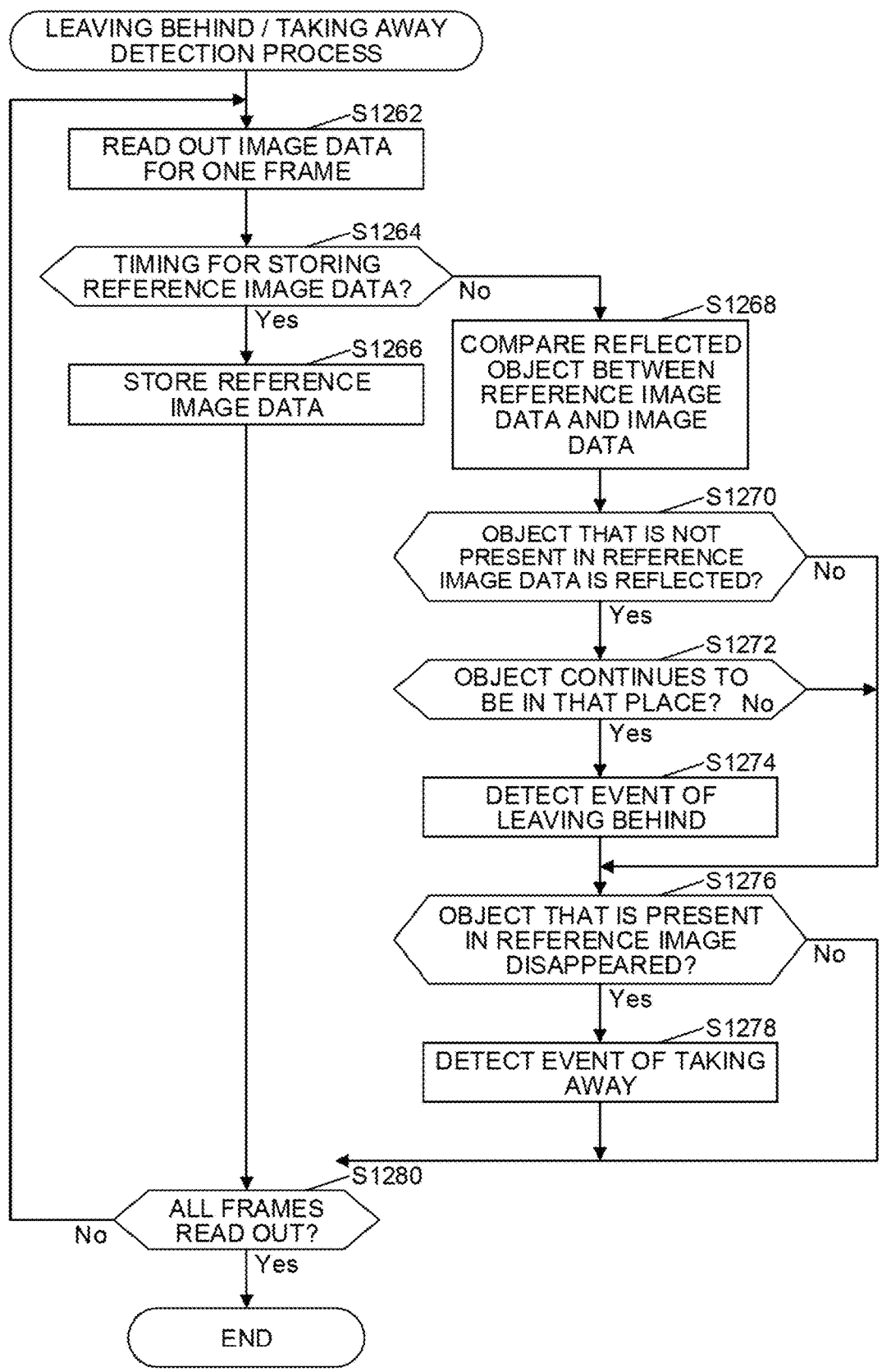
FIG. 15 is a flowchart for explaining a flow of a leaving behind/taking away detection process in the first embodiment.

The leaving behind/taking away detection process will be described with reference to FIG. 15. First, the video data analyzer 260 reads out the image data for one frame (step S1262). Next, the video data analyzer 260 determines whether it is a timing for storing the reference image data (step S1264). When it is the timing for storing the reference image data, the video data analyzer 260 stores the image data read out in step S1262 as the reference image data 278 (step S1264; Yes to step S1266).

The following case can be considered as the timing for storing the reference image data.

1. When Reading Out the First Frame Image Data

When the first frame image data of moving image data is read, there is no image data to be compared. Therefore, the video data analyzer 260 stores the first frame image data of the moving image data as the reference image data 278. In this way, the video data analyzer 260 can compare the first frame image data of the moving image data with the frame image data subsequently read.

2. When Reading the Frame Image Data Immediately After the Detection of Leaving Behind or Taking Away When detecting leaving behind or taking away, the video data analyzer 260 stores the next frame image data as the reference image data 278. By re-storing the reference image data 278, the video data analyzer 260 can avoid continuing to detect leaving behind or taking away.

The video data analyzer 260 may store the frame image data read out in step S1262 as the reference image data 278 when a predetermined time has elapsed, thereby re-storing the reference image data 278 periodically. If the reference image data 278 stored in advance is used continuously, the video data analyzer 260 may determine in step S1264 at all times that it is not the timing for storing the reference image data.

If it is not the timing for storing the reference image data, the video data analyzer 260 then compares a reflected object between the reference image data 278 and the frame image data read out in step S1262 (step S1264; No to step S1268). For example, the video data analyzer 260 detects, from the reference image data 278, an object that fulfills a size condition stored in the event detection condition 284 for determining an object. In addition, the video data analyzer 260 detects, from the image data read in step S1262, an object that fulfills a size condition stored in the event detection condition for determining an object. Then, the video data analyzer 260 matches the object detected from the reference image data 278 against the object detected from the image data read out in step S1262, thereby comparing the objects reflected in the respective pieces of image data.

If an object that is not present in the reference image data is reflected in the image data read out in step S1262 and the object continues to be reflected in almost the same place, the video data analyzer 260 detects an event of leaving behind (step S1270; Yes to step S1272; Yes to step S1274). For determining whether an object continues to be reflected in almost the same place, the video data analyzer 260 first counts the number of consecutive frames when a frame image in which the same object is reflected continues in almost the same area in the frame image data. Then, when the length of the video composed of consecutive frames fulfills the condition of the time during which the object is reflected stored in the event detection condition 284, the video data analyzer 260 may determine that the object continues to be reflected in almost the same place.

In addition, when detecting an event of leaving behind, the video data analyzer 260 acquires, as event information, the coordinates of the area in which the object is reflected and the date and time corresponding to the frame read out in step S1262.

In addition, if an object that is present in the reference image data is not reflected in the image data read out in step S1262, that is, if the object disappears, an event of taking away is detected (step S1276; Yes to step S1278). In doing so, the video data analyzer 260 acquires, as event information, the coordinates of the area where the object is reflected and the date and time corresponding to the frame read out in step S1262.

Next, the video data analyzer 260 determines whether the image data of all frames has been read out (step S1280). If the image data of all frames has not been read t, the process returns to step S1262 (step S1280; No to step S1262). When the image data of all frames has been read out, the video data analyzer 260 ends the leaving behind/taking away detection process (step S1280; Yes).

Figure 16:
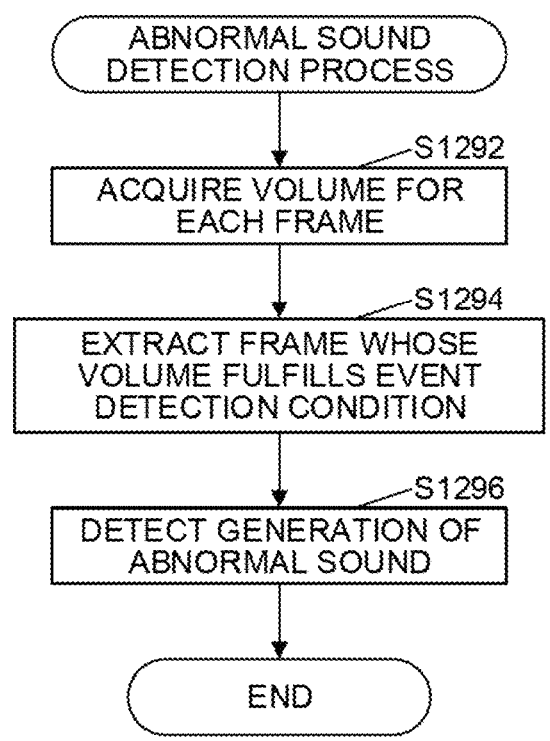
FIG. 16 is a flowchart for explaining a flow of an abnormal sound detection process in the first embodiment.

The abnormal sound detection process will be described with reference to FIG. 16. The video data analyzer 260 acquires the volume generated at the time of each frame from the video data (step S1292). Next, the video data analyzer 260 determines, for each frame whether the volume exceeds the volume stored in the event detection condition, and extracts a frame whose volume exceeds the volume stored in the event detection condition (step S1294). Then, the video data analyzer 260 detects an event of generation of an abnormal sound for each extracted frame, assuming that an abnormal sound has been generated at a time corresponding to the extracted frame (step S1296). In doing so, the video data analyzer 260 acquires, as event information, the date and time corresponding to the extracted frame.

In this way, the video data analyzer 260 executes the moving object detection process, the leaving behind/taking away detection process, and the abnormal sound detection process, thereby detecting an event. Then, the video data analyzer 260 stores information related to the detected event (an event occurrence date and time, an event type, and event content) in the analysis data database 276 together with the video data ID.

Referring back to FIG. 11, the controller 200 determines whether an authentication request has been received from the terminal apparatus 30 (step S1208). The authentication request is a notification for requesting the approval of a user who desires to acquire information stored in the video data storage area 272, video data database 274, and analysis data database 276. The authentication request includes information necessary for authentication such as an account name and a password. When receiving the authentication request, the controller 200 determines whether the account name and password which are the information included in the authentication request are stored in the authentication information storage area 282, and authenticates the user (step S1208; Yes to step S1210).

If the account name and password included in the authentication request are stored in the authentication information storage area 282, the controller 200 authenticates the user who has transmitted the authentication request, and notifies the terminal apparatus 30 that has transmitted the authentication request of the authentication success (step S1210; Yes to step S1212). Next, the controller 200 queries information stored in the video data storage area 272, video data database 274, and analysis data database 276 on the basis of a query request transmitted from the terminal apparatus 30 operated by the user who has been successfully authenticated. Then, the controller 200 transmits the query result to the terminal apparatus 30 (step S1214). If the authentication is not successful, the controller 200 notifies the terminal apparatus 30 that has transmitted the authentication request of the authentication failure (step S1210; No to step S1216).

The query request is a notification requesting to query the video data storage area 272, video data database 274, and analysis data database 276, and to transmit the query result. The query request may include a narrowing-down condition for narrowing down the video data storage area 272, video data database 274, and analysis data database 276. This narrowing-down condition includes information for narrowing down, such as a period, an event type, and event information. For example, if the period is included in the narrowing-down condition, the controller 200 extracts the analysis data related to the event that has occurred during the period, and uses the analysis data as the query result together with the video data corresponding to the extracted analysis data. In addition, if the event type is included in the narrowing-down condition, the controller 200 extracts the analysis data related to the event type, and uses the analysis data as a query result together with the video data corresponding to the extracted analysis data. A plurality of narrowing-down conditions may be specified, and conditions other than those described above may be included.

With regard to the processes of step S1258, step S1274, and step S1278, the video data analyzer 260 may detect an event for the entire image data, or may detect an event for a part of the image data.

1.4.3 Terminal Apparatus

Figure 17:
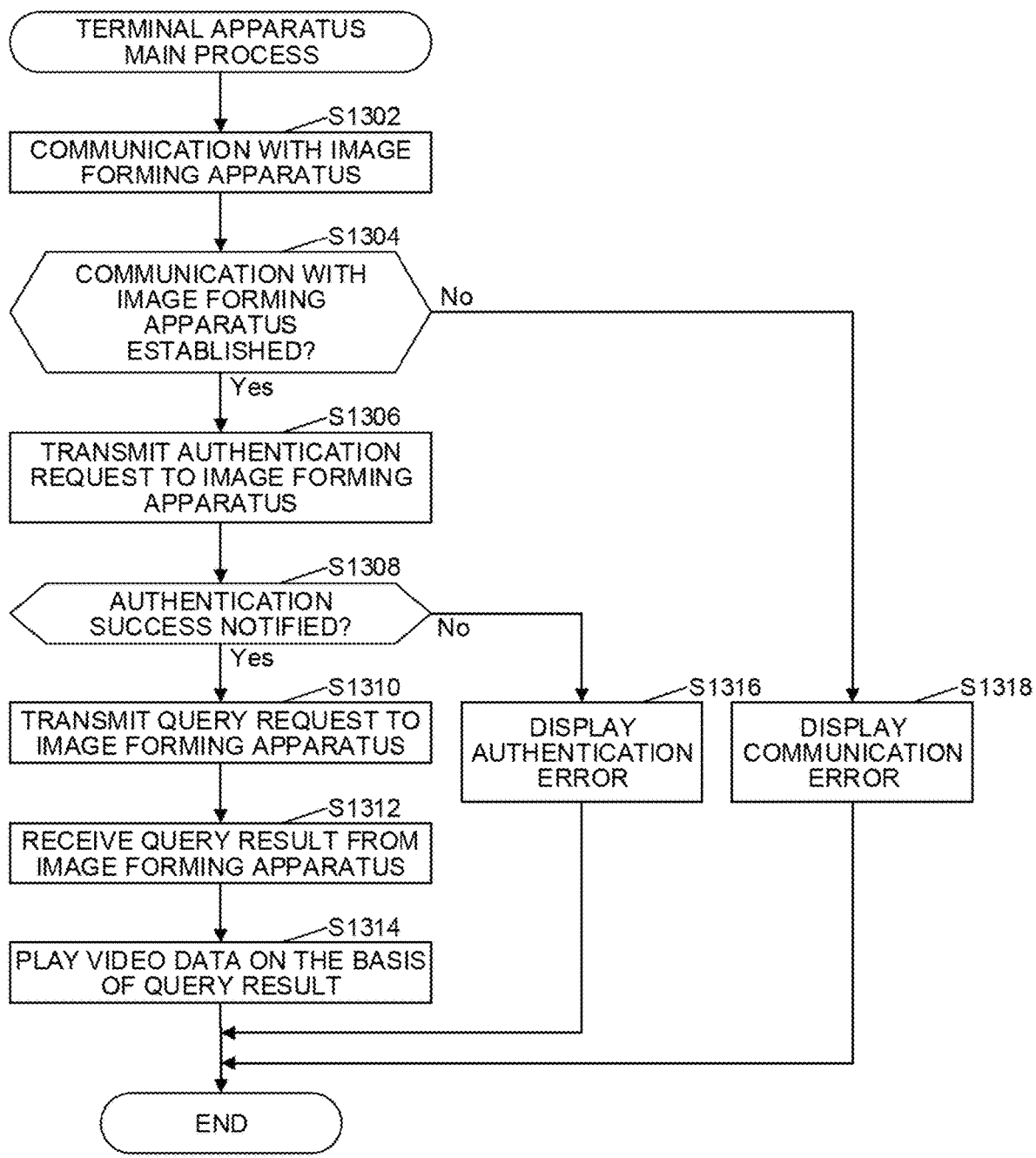
FIG. 17 is a flowchart for explaining a flow of a main process of the terminal apparatus in the first embodiment.

The main process of the terminal apparatus 30 will be described with reference to FIG. 17. First, the controller 300 communicates with the image forming apparatus 20 to determine whether communication with the image forming apparatus 20 has been established (step S1302 to step S1304). When communication with the image forming apparatus 20 is established, the controller 300 then transmits an authentication request to the image forming apparatus 20 (step S1304; Yes to step S1306). In doing so, the controller 300 may prompt the user to input an account name and a password, and may include the account name and password input by the user in the authentication request.

Next, the controller 300 determines whether the authentication success is notified from the image forming apparatus 20 (step S1308). When the authentication success is notified, the controller 300 then transmits a query request to the image forming apparatus 20 (step S1308; Yes to step S1310). In doing so, the controller 300 may prompt the user to input a narrowing-down condition to be included in the query request. Upon receipt of the query result from the image forming apparatus 20 after the transmission of the query request, the controller 300 displays the received query result and plays video data on the basis of the query result (step S1312 to step S1314). In doing so, the controller 300 may play the video data after setting the play start position of a moving image to a position corresponding to or before an event occurrence date and time. In this way, it is possible to make easier for the user to check the video when the event occurs.

If communication with the image forming apparatus 20 cannot be established in step S1304, the controller 300 displays on the display 310 that a communication error has occurred (step S1304; No to step S1318). In addition, in step S1308, if the authentication failure is notified from the image forming apparatus 20, the controller 300 displays on the display 310 that an authentication error has occurred (step S1308; No to step S1316).

1.5 Example of Operation

Figure 18:
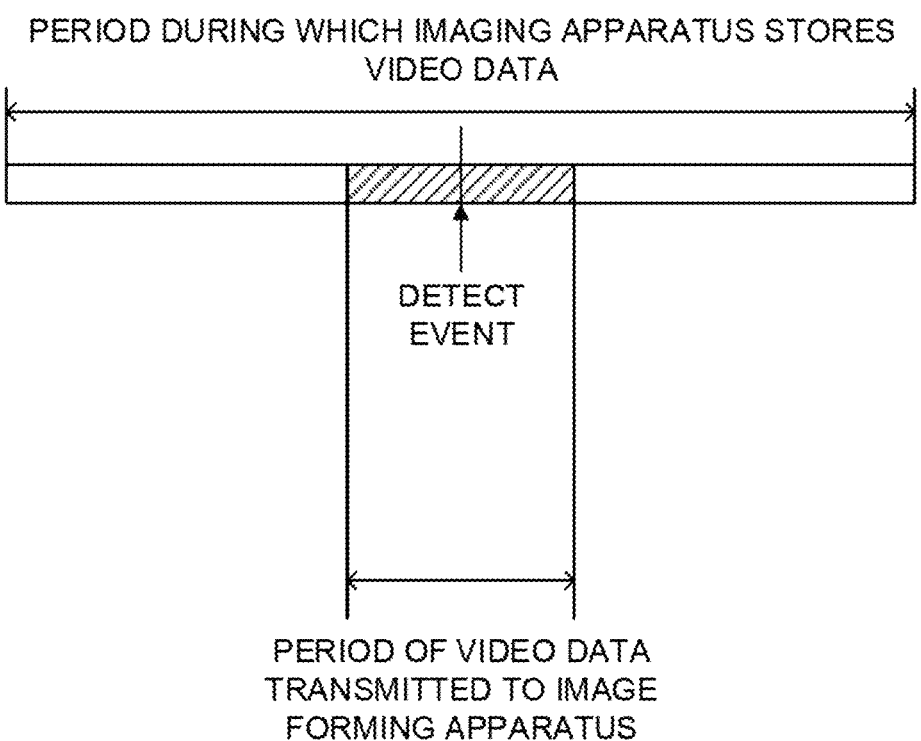
FIG. 18 is a diagram illustrating an example of operation in the first embodiment.

An example of the operation of this embodiment will be described with reference to the drawings. FIG. 18 is a diagram illustrating a period during which the imaging apparatus 10 stores video data and a period of the video data transmitted from the imaging apparatus 10 to the image forming apparatus 20. As illustrated in FIG. 18, the imaging apparatus 10 always stores the video data, but transmits part (untransmitted part) of the video data to the image forming apparatus 20. In addition, the image forming apparatus 20 analyzes the transmitted video data, thereby detecting an event.

Figure 19:
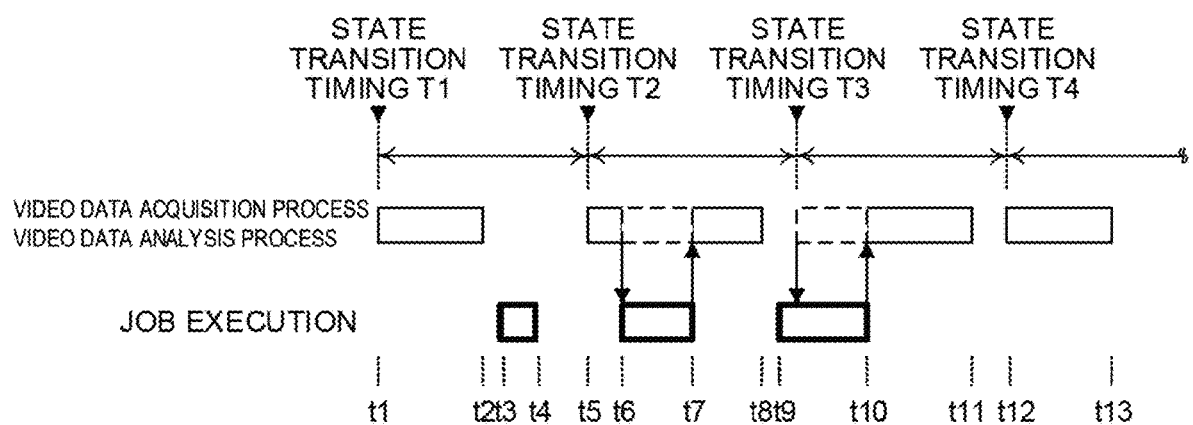
FIG. 19 is a diagram illustrating an example of operation in the first embodiment.

FIG. 19 is a diagram illustrating a timing at which each of the video data acquisition process, video data analysis process, and job execution is executed. In FIG. 19, a state transition timing indicates a timing at which the image forming apparatus 20 transitions the state from the standby state to the video data acquisition process execution state and the video data analysis process execution state. As illustrated in FIG. 19, the state transition timing occurs periodically (for example, every hour) on the basis of the schedule information 280.

For example, in a state transition timing T1, when the state is the standby state, the image forming apparatus 20 sets the state to the video data acquisition process execution state or the video data analysis process execution state. If a job execution is not instructed by the user during the execution of the video data acquisition process and the video data analysis process, the image forming apparatus 20 finishes the video data acquisition process and the video data analysis process without interruption. In this case, from t1 which is the state transition timing T1 to t2, the video data acquisition process and the video data analysis process are executed without interruption due to a job execution.

In addition, in FIG. 19, when a job execution is instructed as from t3 to t4, the image forming apparatus 20 executes the job. The job is completed before a state transition timing T2, and thus at the time of the state transition timing T2, the state of the image forming apparatus 20 is the standby state. Therefore, in the state transition timing T2, the image forming apparatus 20 transitions the state to the video data acquisition process execution state and the video data analysis process execution state. Consequently, the video data acquisition process starts at the timing of t5 which is the state transition timing T2.

Here, when a job is instructed by the user at the timing of t6, the image forming apparatus 20 sets the state to the job execution state and executes the job. If the job execution is completed at the timing of t7, the image forming apparatus 20 returns to the state before the transition to the job execution state. In this way, the video data acquisition process and the video data analysis process are resumed. In this case, the video data acquisition process and the video data analysis process are executed between t5 and t6 and between t7 and t8.

In FIG. 19, when a job execution is instructed as from t9 to t10, the image forming apparatus 20 executes the job. In this case, the job is not completed in the timing of a state transition timing T3, and thus the image forming apparatus 20 waits without changing the state until the job is completed. When the job execution is completed at the timing of t10, the image forming apparatus 20 sets the state to the video data acquisition process execution state and the video data analysis process execution state. In this case, the video data acquisition process and the video data analysis process are executed between t10 and t11.

In a state transition timing T4, the state is the standby state. Thus, the image forming apparatus 20 sets the state to the video data acquisition process execution state, and after the video data acquisition process is completed, sets the state to the standby state and further sets the state to the video data analysis process execution state.

Figure 20:
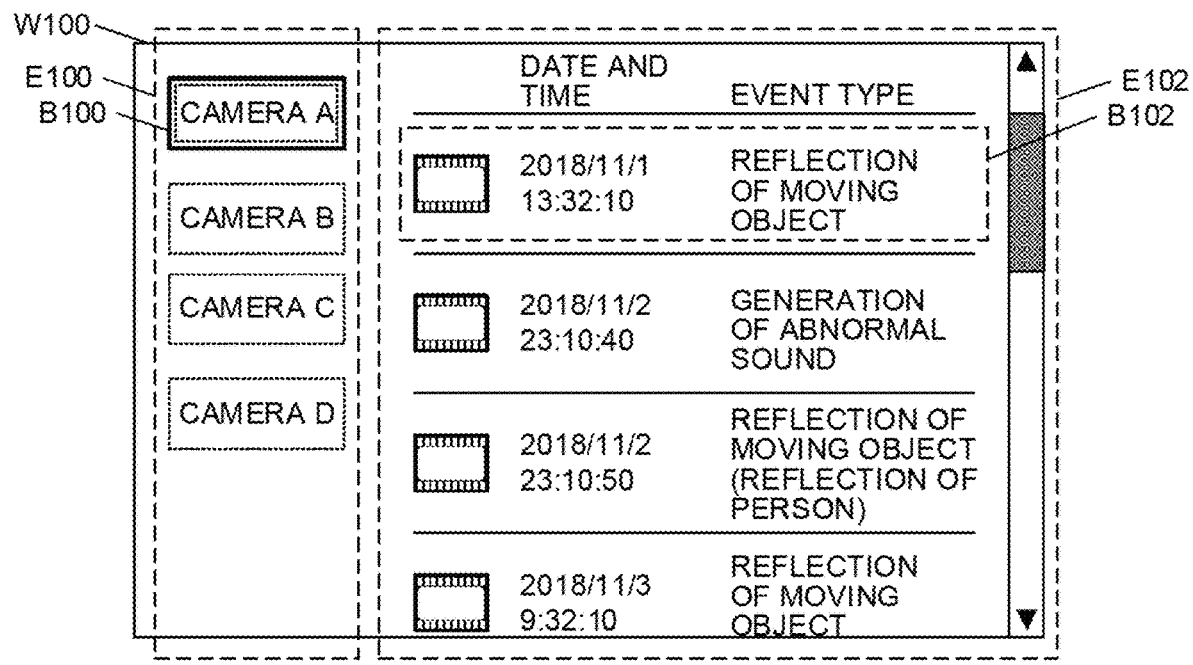
FIG. 20 is a diagram illustrating an example of operation in the first embodiment.

FIG. 20 is a screen example of a query result display screen W100 displayed on the display 310 by the terminal apparatus 30 in step S1314. The display screen W100 is displayed on the terminal apparatus 30 by, for example, executing an application that acquires video data and analysis data from the image forming apparatus 20 and displaying the acquired data. The display screen W100 displays the events detected by the image forming apparatus 20 for each imaging apparatus 10 in a list. The display screen W100 includes an area E100 for selecting the imaging apparatus 10 and an area E102 for displaying the list. The area E100 includes a button for selecting one of the plurality of imaging apparatuses 10. FIG. 20 illustrates, a state where the imaging apparatus 10 named "CAMERA A" is selected, by highlighting a button B100 indicating "CAMERA A" of the imaging apparatuses 10.

In addition, the area E102 contains a list that displays the events detected by analyzing the video data generated by "CAMERA A". For example, an item B102 item indicates that an event of reflection of a moving object has been detected on Nov. 1, 2018, at 13:32:10. In the item B102, a thumbnail image of the frame image data when the event has occurred may be displayed. Moreover, if the item B102 is selected by the user, the terminal apparatus 30 displays the corresponding video data. In doing so, the terminal apparatus 30 may play the video data from the time when the event has occurred, or slightly before the time when the event has occurred, or may display on the basis of the event content in the video data (for example, may display a rectangular area based on the event content). In this way, it is possible to make the user properly check the event that has occurred.

In the list displayed in the area E102, events that have not been confirmed by the user may be preferentially displayed, or events that have occurred more recently may be preferentially displayed. In addition, narrowing-down and grouping may be performed on the basis of the event type and event content. Moreover, in the area E102, an item for each video data may be displayed instead of an item for each event. In doing so, on the basis of the event detection detected/undetected flag stored in the video data database 274, video data with detected events or video data with a large number of detected events may be preferentially displayed. In this way, the terminal apparatus 30 can present to the user video data to be preferentially confirmed. Furthermore, the display screen W100 may display statistical information about an event that has occurred (for example, a table or graph indicating the number of occurrences for each event type for each imaging apparatus 10 or for all imaging apparatuses 10), or may display the video currently being captured by the imaging apparatus 10.

According to this embodiment, the video data is analyzed with the use of the controller included in the image forming apparatus, and the analysis data is stored with the use of the storage included in the image forming apparatus. Therefore, it is possible to eliminate the labor and expense of installing equipment for building an event detection system. In addition, the user can easily check an event by querying the analysis data and playing the video data from a position corresponding to the event occurrence date and time included in the analysis data. For example, the imaging apparatus 10 captures an image during a specific time period when there are no people, and the image forming apparatus 20 executes the video data analysis process after the specific time period. The user of the event detection system 1 thereby can easily confirm an event detected during the time period when there are no people. Furthermore, since the analysis is based on the video data, it is possible to detect an event (for example, leaving behind or taking away of an object, or generation of an abnormal sound) that cannot be detected by a moving object sensor.

In addition, since the imaging apparatus operates constantly or for a fixed period and stores video data, it is possible to keep the video before and after an event occurrence without missing. In addition, even if the imaging apparatus or the image forming apparatus is equipped with a moving object sensor, the apparatus analyzes the video outside the moving range of the moving object sensor and detects an event, and thus can detect and acquire a wider range of video data. Since video data is stored in the imaging apparatus, even if a network failure occurs, the image forming apparatus can acquire and analyze the video data again after the network is restored, and can link the video data to an event.

In this embodiment, since analysis data and video data are linked, analysis data with a small data size can be queried, and video data corresponding to the query result can be displayed. In this way, the administrator or the like of the event detection system 1 can easily query the video data where an event has occurred, an event occurrence date and time, and an event type, and can confirm the event. In addition, the administrator or the like of the event detection system 1 can save the trouble of checking the video data in a time period when no event has occurred.

Furthermore, since event detection is performed by the image forming apparatus 20, it is possible to easily enhance or change a function to detect an event later, or to easily change or add an event type to be detected. For example, it is possible to add a function to detect an event using artificial intelligence, or add a function to detect an event in conjunction with an internet of things (IoT) sensor that detects such as door opening and closing.

In the above-described embodiment, while the video data analysis is performed by the image forming apparatus, the video data may be analyzed by a server or an image analysis apparatus installed on the network, and the analysis data may be transmitted to the image forming apparatus. In this way, the image forming apparatus can use analysis data based on analysis that cannot be performed with the processing capability of the image forming apparatus (for example, analysis using machine learning that requires relatively high processing performance).

Moreover, the event detected by the image forming apparatus 20 may be a part of the above-described event or may be an event other than the above-described events. In addition, the imaging apparatus 10 or the image forming apparatus 20 may omit/add a functional unit and a process on the basis of the type of an event to be detected. For example, if the generation of an abnormal sound is not detected, the audio inputter 120 of the imaging apparatus 10 may be omitted, and the video data analyzer 260 does not have to execute step S1246 in FIG. 13.

In addition, in the event detection condition, a condition such that an event is detected when a predetermined state continues may be stored. For example, a condition may be stored, in which an event is detected when a moving object is reflected for longer than a predetermined time (for example, "5 seconds") or when an abnormal sound continues to be recorded for longer than a predetermined time. In this way, an event is detected when a state continues, and it is thereby possible to reduce false detection of the event.

2. Second Embodiment

Next, a second embodiment will be described. Unlike the first embodiment, the second embodiment is for analyzing video data while changing the event detection condition used in the video data analysis process. This embodiment is obtained by replacing FIG. 14 of the first embodiment with FIG. 21. The same functional units and processes are denoted by the same reference numerals, and the description thereof is omitted.

In this embodiment, a first event detection condition and a second event detection condition are stored as the event detection condition. Here, it is assumed that an event can be detected with the second event detection condition more accurate than with the first event detection condition.

Here, in this embodiment, a case where the event detection condition used by the video data analyzer 260 is changed in the moving object detection process will be described. In this case, for example, an area condition is set to "30% or more" as the first event detection condition (a first set value). In addition, for example, the area condition is stored as "15% or more" as the second event detection condition (a second set value). By detecting an event with the use of the second event detection condition, it is possible to detect the reflection of a moving object even when the size of the moving object is smaller than when using the first event detection condition. In this case, the video data analyzer 260 can determine whether the detailed motion of the moving object is reflected when the moving object is detected in accordance with the first event detection condition.

As for the first event detection condition and the second event detection condition, appropriate conditions may be stored by the administrator or the like of the image forming apparatus 20 in accordance with the event type detected by the video data analyzer 260. In addition, depending on the event type, the same condition may be stored for the first event detection condition and the second event detection condition.

Figure 21:
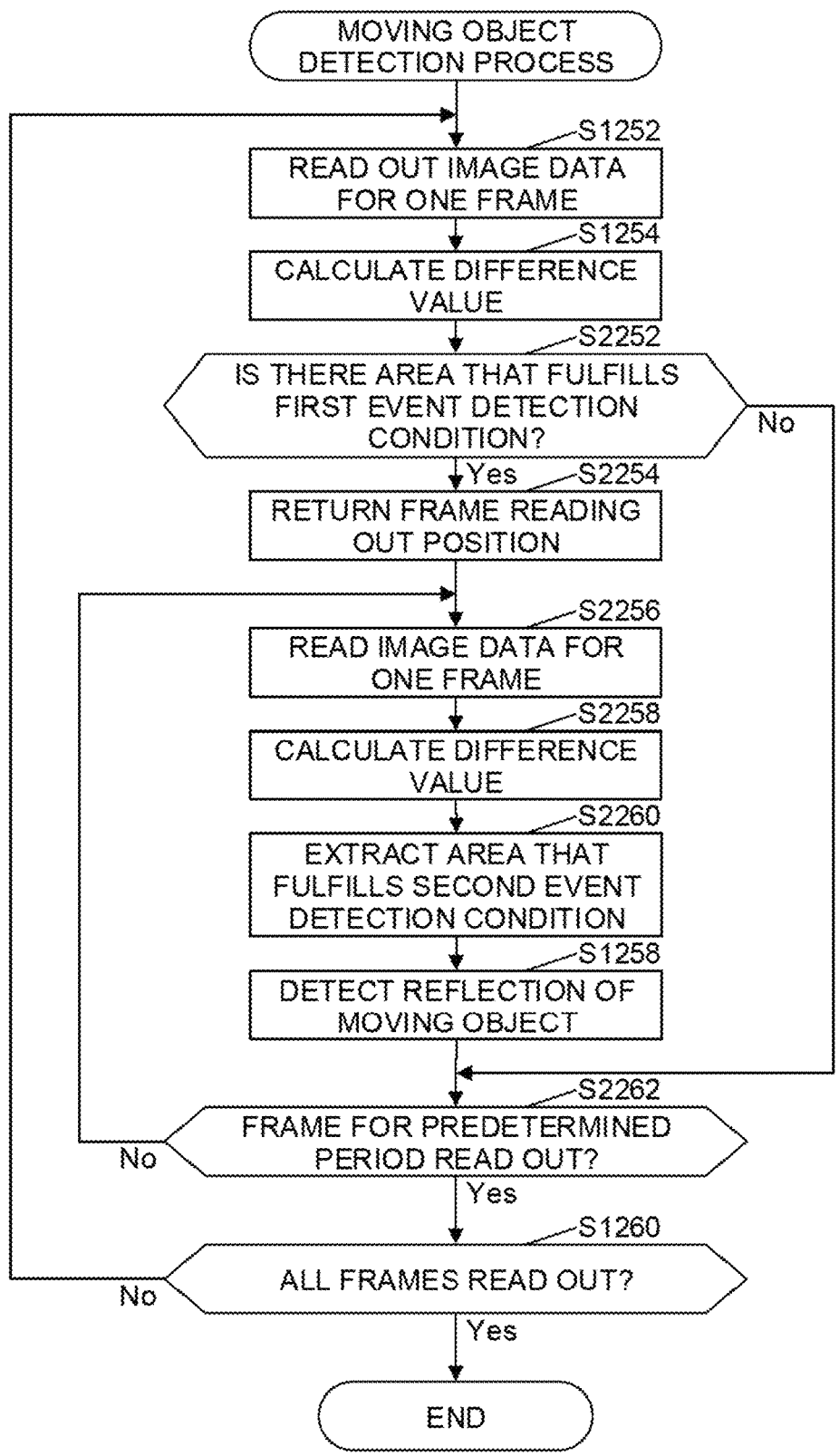
FIG. 21 is a flowchart for explaining a flow of a moving object detection process in a second embodiment.

FIG. 21 is a flowchart of the moving object detection process in this embodiment.

The video data analyzer 260 calculates a difference value between frames, and then determines whether an area that fulfills the first event detection condition is included on the basis of the difference value (step S2252).

If an area that fulfills the first event detection condition is included, the video data analyzer 260 returns a frame reading out position in the video data by a predetermined time (for example, 5 seconds) (step S2252; Yes to step S2254). Then, the video data analyzer 260 reads an image for one frame and calculates a difference value between frames (step S2256 to step S2258).

Next, the video data analyzer 260 extracts an area that fulfills the second event detection condition on the basis of the difference value (step S2260), and detects the reflection of a moving object on the basis of the area (step S1258).

Then, the video data analyzer 260 determines whether a frame for a predetermined period (for example, 10 seconds) has been read out (step S2262). If a frame for the predetermined period has not been read out, the process returns to step S2256 (step S2262; No to step S2256).

For example, in step S2254, the frame reading out position is returned by 5 seconds, and then the event detection process is executed for 10 seconds of the video data. In this case, the video data analyzer 260 performs the event detection process in accordance with the second event detection condition for a period of 5 seconds before and after a time when the event has been detected. For the event detected using the first event detection condition, the video data analyzer 260 can acquire the event content in detail with the use of the second event detection condition.

The length of the period for acquiring the event content in detail may be determined in advance or may be set by the administrator of the image forming apparatus 20. In addition, depending on the event type detected with the first event detection condition, the period for acquiring the event content in detail may be different. If the event occurrence time detected with the first event detection condition is close to the beginning or end of the video data, analysis using the second set value may be performed across a plurality of pieces of video data.

In the leaving behind/taking away detection process, the event detection condition may also be changed and analysis may be performed. For example, in the leaving behind/taking away detection process, the size condition with which the object is determined to be an object is set to be smaller in the first event detection condition than in the second event detection condition. In this way, when the leaving behind or taken way of an object is detected on the basis of the first event detection condition, it is possible to detect the leaving behind and taking away of a small object that is not detected by the first event detection condition.

According to this embodiment, when an event is detected, it is possible to detect the event in accordance with a more accurate event detection condition. Therefore, it is possible to efficiently detect an event with high accuracy.

3. Third Embodiment

Next, a third embodiment will be described. Unlike the first embodiment, the third embodiment is for analyzing video data while changing the interval of the frame image data to be read out from the video data in the video data analysis process. This embodiment is obtained by replacing FIG. 14 of the first embodiment with FIG. 22. The same functional units and processes are denoted by the same reference numerals, and the description thereof is omitted.

Figure 22:
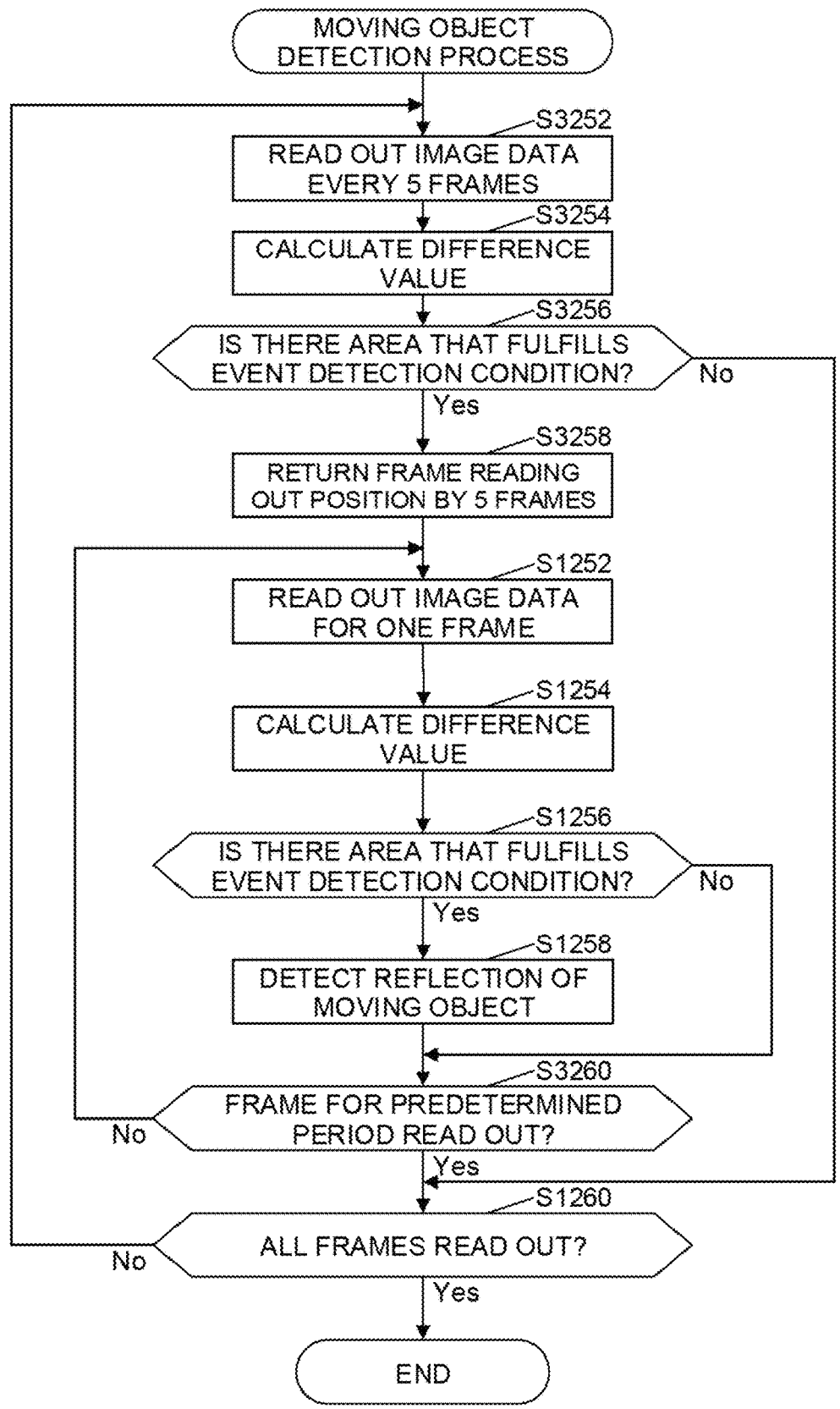
FIG. 22 is a flowchart for explaining a flow of a moving object detection process in a third embodiment.

FIG. 22 is a flowchart of the moving object detection process in this embodiment. In the moving object detection process of this embodiment, the interval of the number of frames of the frame image data to be read out from the video data is changed to two, every 5 frames or every 1 frame. In this way, the image forming apparatus 20 first performs the event detection process on a part of frame image data, and when an event is detected, performs the event detection process again for the frame image data at a time including a time when the event occurs. The interval of the number of frames may be any number other than 5 frames and 1 frame.

First, the video data analyzer 260 reads out the image data from the video data every 5 frames (step S3252). The video data analyzer 260 calculates a difference value between the image data read out in step S3252 and the image data read out immediately before reading out in step S3252 (step S3254). When reading out the image data every 5 frames as in this embodiment, in step S3254, the video data analyzer 260 calculates a difference value between the frame image data read out in step S3252 and the frame image data 5 frames before the frame image data.

The video data analyzer 260 determines whether there is an area that fulfills the event detection condition, on the basis of the difference value (step S3256). If there is an area that fulfills the event detection condition, the video data analyzer 260 returns the frame reading out position by 5 frames (step S3258) and detects an event in units of one frame (steps S1252 to S1258).

Then, the video data analyzer 260 determines whether a frame for a predetermined period (for example, 10 seconds) has been read out (step S3260). If a frame for the predetermined period has not been read out, the process returns to step 1252 (step S3260; No to step S1252).

The interval between frame image data read out from the video data and the interval of the frame for obtaining a volume may also be changed in the leaving behind/taking away process and the abnormal sound detection process.

According to this embodiment, first, an event is detected while thinning out the frame to be analyzed, and when the event is detected, it is possible to acquire in detail the event content related to the event that has occurred. In this way, the video data analysis process can be executed efficiently.

4. Fourth Embodiment

Next, a fourth embodiment will be described. In the fourth embodiment, with regard to the state transition, transition to the video data acquisition process execution state is performed when the external environment changes or the image forming apparatus 20 enters a sleep state or a power saving state, instead of when it is a predetermined date and time.

For example, an illuminance sensor that measures an illuminance is installed in the image forming apparatus 20, and when the illuminance measured by the illuminance sensor falls below a predetermined illuminance, the image forming apparatus 20 may set the state to the video data acquisition process execution state. In addition, a human sensor that detects a person around the image forming apparatus 20 is installed in the image forming apparatus 20, and when there is no person around the image forming apparatus 20, the image forming apparatus 20 may set the state to the video data acquisition process execution state. In this way, the image forming apparatus 20 can execute an event detection process triggered by a change in the external environment which the room in which the image forming apparatus 20 is installed has become dark or there are no people in the room.

In addition the age forming apparatus 20 may set the state to the video data acquisition process execution state when the image forming apparatus 20 enters a sleep state or a power saving state because the user does not operate the image forming apparatus 20. In this way, the video data acquisition process can be executed at a timing when the user is not executing a job.

As described above, in this embodiment, it possible to execute the video data acquisition process and video data analysis process on the basis of a change in the external environment and the state of the image forming apparatus 20. In particular, in a situation where there are no people around the image forming apparatus 20, the image forming apparatus 20 executes the video data acquisition process and video data analysis process, and thus can efficiently detect an event in a space that should be monitored.

5. Fifth Embodiment

Next, a fifth embodiment will be described. In the fifth embodiment, the video data analyzer 260 detects leaving behind/taking away of an object in the image forming apparatus 20.

In this embodiment the imaging apparatus 10 captures an area where the image forming apparatus 20 is installed. In this embodiment, as the reference image data 278, image data in a state where the image forming apparatus 20 is not used is stored. The state where the image forming apparatus 20 is not used means, for example, a state where no paper is placed in the paper output tray and the equipment of the image forming apparatus 20 is placed in a predetermined place.

In this way, in this embodiment, in the leaving behind/taking away detection process, the state where the image forming apparatus 20 is not used is compared with the video data captured by the imaging apparatus 10. Therefore, for example, when a recording paper is left in the paper output tray of the image forming apparatus 20, the video data analyzer 260 can detect that the recording paper has been left behind on the basis of the video data acquired from the imaging apparatus 10. In addition, even when the equipment of the image forming apparatus 20 is taken out, the video data analyzer 260 can detect that the equipment of the image forming apparatus 20 has been taken ay on the basis of the video data acquired from the imaging apparatus 10.

As described above, in this embodiment, an event related to the image forming apparatus 20 can be detected.

6. Variations

The present invention is not limited to the above-described embodiments, and various modifications are possible. That is, implementations obtained by combining techniques appropriately changed without departing from the gist of the present invention are also included in the technical scope of the present invention.

In addition, while the above-described embodiments have parts described separately for convenience of explanation, it is needless to say that the embodiments may be combined and executed within the technically possible range.

In addition, a program that runs on each of the apparatuses in the embodiments is a program that controls the CPU or the like (a program that makes the computer function) to implement the functions of the above-described embodiments. In addition, the information handled by these apparatuses is temporarily stored in a temporary storage device (for example, a RAM) at the time of processing, and then stored in various storage devices such as a read only memory (ROM) and an HDD, and is read, modified, and written by the CPU as necessary.

Here, as a storage medium for storing the program, any of a semiconductor medium (for example, a ROM, a nonvolatile memory card, etc.), an optical storage medium/a magneto-optical storage medium (for example, a digital versatile disc (DVD), a magneto optical disc (MO), a mini disc (MD), a compact disc (CD), a Blu-ray Disc (BD) (registered trademark), etc.), a magnetic storage medium (for example, a magnetic tape, a flexible disk, etc.) may be used. In addition, by executing the loaded program, not only the functions of the above-described embodiments are implemented, but also the functions of the present invention may be implemented by co-processing with the operating system, another application program, or the like on the basis of the instructions of the program.

For distribution to the market, the program can be stored in a portable storage medium and distributed, or transferred to a server computer connected via a network such as the Internet. In this case, the storage device of the server computer is, as a matter of course, also included in the present invention.

DESCRIPTION OF REFERENCE NUMERALS 1 event detection system
10 imaging apparatus
100 controller
110 image inputter
120 audio inputter
130 communicator
140 storage
142 video data storage area
20 image forming apparatus
200 controller
210 image inputter
220 image former
230 display
240 operation inputter
250 communicator
260 video data analyzer
270 storage
272 video data storage area
274 video data database
276 analysis data database
278 reference image data
280 schedule information
282 authentication information storage area
30 terminal apparatus
300 controller
310 display
320 operation inputter
330 communicator
340 storage

What is claimed is:

1. An image forming apparatus comprising:
a job executor that executes a job;
an image former that performs an image forming process on a basis of the job;
an acquiror that acquires image data captured;
a detector that analyzes the image data to detect an event; and
a set value storage that stores a first set value used for event detection and a second set value for detecting an event with higher accuracy than the first set value,
wherein the detector detects the event when the job executor is in a standby state,
wherein when detecting an event with a use of the first set value, the detector analyzes image data with a use of the second set value, with respect to image data captured at a time including a time when the event detected occurs.

2. The image forming apparatus according to claim 1, wherein the acquiror acquires the image data when the job executor is in a standby state.

3. The image forming apparatus according to claim 2, wherein the detector analyzes a part of the image data acquired to detect an event.

4. The image forming apparatus according to claim 3, wherein when the part of the image data acquired is analyzed and an event is detected, the detector analyzes image data including the part of the image data acquired.

5. The image forming apparatus according to claim 2, further comprising a reference image data storage that stores reference image data which is a reference for comparison with the image data,
wherein the detector detects an event on a basis of a difference between the image data acquired and the reference image data.

6. The image forming apparatus according to claim 1, wherein the detector analyzes a part of the image data acquired to detect an event.

7. The image forming apparatus according to claim 6, wherein when the part of the image data acquired is analyzed and an event is detected, the detector analyzes image data including the part of the image data acquired.

8. The image forming apparatus according to claim 1, further comprising a reference image data storage that stores reference image data which is a reference for comparison with the image data,
wherein the detector detects an event on a basis of a difference between the image data acquired and the reference image data.

9. An image forming apparatus comprising:
a job executor that executes a job;
an image former that performs an image forming process on a basis of the job;
an acquiror that acquires image data captured;
a detector that analyzes the image data to detect an event;
an illuminance measure that measures an illuminance; and
a set value storage that stores a first set value used for event detection and a second set value for detecting an event with higher accuracy than the first set value,
wherein the detector detects the event when the job executor is in a standby state and the illuminance measured falls below a predetermined illuminance,
wherein when detecting an event with a use of the first set value, the detector analyzes image data with a use of the second set value, with respect to image data captured at a time including a time when the event detected occurs.

10. An event detection system including an imaging apparatus and an image forming apparatus,
the imaging apparatus comprising:
an inputter that inputs an image; and
an image data storage that stores the image input as image data,
wherein the image forming apparatus comprising:
a job executor that executes a job;
an image former that performs an image forming process on a basis of the job;
an acquiror that acquires the image data from the imaging apparatus;
a detector that analyzes the image data to detect an event; and
a set value storage that stores a first set value used for event detection and a second set value for detecting an event with higher accuracy than the first set value,
wherein the detector detects the event when the job executor is in a standby state,
wherein when detecting an event with a use of the first set value, the detector analyzes image data with a use of the second set value, with respect to image data captured at a time including a time when the event detected occurs.

\* \* \* \* \*